US012168485B2

(12) United States Patent
Yoshida et al.

(10) Patent No.: US 12,168,485 B2
(45) Date of Patent: Dec. 17, 2024

(54) STEERING CONTROL DEVICE AND STEERING SYSTEM

(71) Applicants: JTEKT CORPORATION, Kariya (JP); TOYOTA JIDOSHA KABUSHIKI KAISHA, Toyota (JP)

(72) Inventors: Kenji Yoshida, Nagoya (JP); Isao Namikawa, Okazaki (JP); Terutaka Tamaizumi, Okazaki (JP); Kosuke Akatsuka, Mishima (JP); Yoshio Kudo, Machida (JP)

(73) Assignees: JTEKT CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 188 days.

(21) Appl. No.: 17/710,469

(22) Filed: Mar. 31, 2022

(65) Prior Publication Data

US 2022/0315097 A1 Oct. 6, 2022

(30) Foreign Application Priority Data

Apr. 6, 2021 (JP) .................................. 2021-064974

(51) Int. Cl.
*B62D 5/04* (2006.01)
*B62D 6/00* (2006.01)

(52) U.S. Cl.
CPC ........... *B62D 5/0463* (2013.01); *B62D 6/008* (2013.01)

(58) Field of Classification Search
CPC ...... B62D 5/0463; B62D 6/008; B62D 5/046; B62D 5/0472; B62D 6/00
See application file for complete search history.

(56) References Cited

U.S. PATENT DOCUMENTS 5,508,921 A * 4/1996 Chikuma ............. B62D 7/1581
701/41
6,239,568 B1 * 5/2001 Sugitani ................... B62D 6/00
701/72

(Continued)

FOREIGN PATENT DOCUMENTS

JP 2003-002223 A 1/2003
JP 2015-063291 A 4/2015

(Continued)

OTHER PUBLICATIONS

Sep. 29, 2022 Search Report issued in European Patent Application No. 22165912.1.

(Continued)

*Primary Examiner* — Kurt Philip Liethen
(74) *Attorney, Agent, or Firm* — Oliff PLC

(57) ABSTRACT

In a steering control device configured to control a steering system where a steering torque required for steering a steering wheel is changed using a motor torque, a processing circuit includes a first calculation situation where a calculational hysteresis component for adding a first hysteresis characteristic to a torque component is calculated and a second calculation situation where the calculational hysteresis component for adding a second hysteresis characteristic to the torque component is calculated. In the second calculation situation after change from the first calculation situation, the processing circuit calculates a value corresponding to an origin in the second hysteresis characteristic at a time when the calculational hysteresis component enabling a value of the calculational hysteresis component at a timing of the change from the first calculation situation to be maintained is calculated, and calculates the calculational hysteresis component using the calculated value as the origin.

4 Claims, 11 Drawing Sheets

(56) References Cited

U.S. PATENT DOCUMENTS

| | | | | |
|---|---|---|---|---|
| 7,966,114 | B2* | 6/2011 | Yamazaki | B62D 15/025 |
| | | | | 180/443 |
| 9,272,730 | B2* | 3/2016 | Tamaizumi | B62D 6/008 |
| 10,155,535 | B2* | 12/2018 | Chiba | B62D 5/0463 |
| 11,192,579 | B2* | 12/2021 | Ishida | B62D 15/025 |
| 2009/0112406 | A1* | 4/2009 | Fujii | B62D 5/0463 |
| | | | | 701/42 |
| 2014/0303850 | A1* | 10/2014 | Chai | G01M 17/06 |
| | | | | 701/42 |
| 2015/0057892 | A1 | 2/2015 | Tamaizumi et al. | |
| 2016/0229446 | A1* | 8/2016 | Tamaizumi | B62D 6/002 |
| 2017/0267276 | A1* | 9/2017 | Kodera | B62D 5/0463 |
| 2018/0339725 | A1* | 11/2018 | Kodera | B62D 5/046 |
| 2020/0283059 | A1 | 9/2020 | Kodera et al. | |
| 2021/0053610 | A1 | 2/2021 | Kodera et al. | |

FOREIGN PATENT DOCUMENTS

| | | |
|---|---|---|
| JP | 2020-142596 A | 9/2020 |
| JP | 2021-030838 A | 3/2021 |

OTHER PUBLICATIONS

Aug. 27, 2024 Office Action issued in Japanese Patent Application No. 2021-064974.

\* cited by examiner

STEERING CONTROL DEVICE AND STEERING SYSTEM

CROSS-REFERENCE TO RELATED APPLICATION

This application claims priority to Japanese Patent Application No. 2021-064974 filed on Apr. 6, 2021, incorporated herein by reference in its entirety.

BACKGROUND

1. Technical Field

The disclosure relates to a steering control device.

2. Description of Related Art

There has been a steer-by-wire steering system in which a power transmission path between a steering unit that is steered by a driver and a turning unit that turns turning wheels according to a driver's steering is cut off, as a kind of steering system. In such a kind of steering system, road surface information such as a road-surface reaction force applied to the turning wheels is not mechanically transmitted to a steering wheel. Therefore, a steering control device that controls such a kind of steering system performs control such that road surface information is transmitted to a driver by controlling a steering-side actuator provided in the steering unit such that a steering reaction force is applied to the steering wheel in consideration of the road surface information.

For example, a steering control device described in Japanese Unexamined Patent Application Publication No. 2020-142596 (JP 2020-142596 A) determines a steering reaction force in consideration of axial forces acting on a turning shaft provided in a turning unit. In the steering control device described in JP 2020-142596 A, an angle axial force based on a target turning angle for controlling a turning angle of turning wheels which is calculated based on a steering angle of a steering wheel, or the like is exemplified as one axial force.

SUMMARY

A relationship between the steering angle serving as a basis of the target turning angle and an axial force actually acting on the turning shaft changes according to a vehicle speed. When a vehicle is in a stopped state, an axial force gradient which is a rate of change of the axial force with respect to the steering angle decreases and a hysteresis width of the axial force with respect to change of the steering angle increases. On the other hand, when the vehicle is traveling at a middle or high speed, the axial force gradient increases and the hysteresis width decreases. The angle axial force may be calculated by adding a calculational hysteresis component such that a hysteresis width, in which an actual hysteresis status of the axial force with respect to change of the steering angle is reflected, is provided.

When a situation in which, for example, the hysteresis width changes more than expected occurs as a result of addition of the calculational hysteresis component, there is a likelihood that movement of the steering wheel or a feeling acquired from the steering wheel may cause discomfort.

This problem is not limited to the angle axial force calculated as a component of a steering reaction force, and can be caused similarly when a component of the steering reaction force is calculated by adding the calculational hysteresis component such that a hysteresis width for reflecting an actual hysteresis status is provided.

An aspect of the disclosure relates to a steering control device configured to control a steering system in which a steering torque required for steering a steering wheel is changed using a motor torque applied from an actuator with a motor as a drive source. The steering control device includes a processing circuit configured to calculate a torque command value that is a target value of the motor torque when operation of the motor is controlled such that the motor torque is generated. The processing circuit is configured to calculate a torque component used to calculate the torque command value based on a state variable changing according to operation of the steering system. The processing circuit is configured to calculate a calculational hysteresis component for adding, to the torque component, a hysteresis characteristic with respect to change of a specific state variable changing with steering of the steering system, the calculational hysteresis component being acquired using, as an origin, a value of the specific state variable set at a predetermined timing. The processing circuit includes a first calculation situation in which the calculational hysteresis component for adding a first hysteresis characteristic to the torque component is calculated and a second calculation situation in which the calculational hysteresis component for adding a second hysteresis characteristic having a hysteresis width larger than a hysteresis width of the first hysteresis characteristic to the torque component is calculated. In the second calculation situation after change from the first calculation situation, the processing circuit may calculate a value corresponding to the origin in the second hysteresis characteristic at a time when the calculational hysteresis component enabling a value of the calculational hysteresis component at a timing of the change from the first calculation situation to be maintained is calculated, and may calculate the calculational hysteresis component using the calculated value as the origin.

With this configuration, it is possible to calculate the calculational hysteresis component by correcting the origin used to calculate the calculational hysteresis component depending on a situation. For example, the situation in which change has been made from the first calculation situation to the second calculation situation (i.e., the first calculation situation has been changed to the second calculation situation) is a situation in which the hysteresis width is assumed to change more than expected before and after the change when the calculational hysteresis component is calculated. In this regard, the origin used to calculate the calculational hysteresis component is corrected on the condition that the first calculation situation has been changed to the second calculation situation. Accordingly, even when the specific state variable is maintained at the value at the timing of the change from the first calculation situation, it is possible to curb sudden change of the hysteresis width between the pre-change calculational hysteresis component and the post-change calculational hysteresis component. Accordingly, since a situation in which the hysteresis width changes suddenly in the calculational hysteresis component is curbed, it is possible to restrain a situation in which movement of the steering wheel or a feeling acquired from the steering wheel causes discomfort. Accordingly, it is possible to achieve improvement of a feeling of steering.

In the steering control device according to the aspect, the processing circuit may be configured to calculate a base component of an angle axial force as the torque component, the angle axial force being determined according to an angle that is convertible to a turning angle of turning wheels of a vehicle, and the angle axial force being an axial force in which road surface information is not reflected; and the processing circuit may be configured to calculate the calculational hysteresis component that is added to the base component.

In the steering control device according to the aspect, the processing circuit may be configured to reflect, in the torque component, the calculational hysteresis component acquired through calculation in the first calculation situation, in a first state in which a vehicle is able to be determined to be in a traveling state that does not include a stopped state; and the processing circuit may be configured to reflect, in the torque component, the calculational hysteresis component acquired through calculation in the second calculation situation, in a second state in which the vehicle is able to be determined to be in a traveling state including the stopped state.

With this configuration, when change has been made from the first state to the second state (i.e., the first state has been changed to the second state), the value of the calculational hysteresis component at the timing of the change from the first state can be maintained. Accordingly, even when the change has been made from the first state to the second state (i.e., the first state has been changed to the second state), it is possible to achieve improvement of a feeling of steering. From a point of view of transmitting friction of the turning wheels of the vehicle to a driver, it is convenient to greatly change the hysteresis width in the second state, between the first state and the second state. That is, the situation in which the hysteresis width is assumed to greatly change when the calculational hysteresis component is calculated corresponds to a situation in which the first state has been changed to the second state. Accordingly, it is possible to achieve improvement of a feeling of steering while realizing a convenient mode from a point of view of transmitting friction of the turning wheels of the vehicle to a driver.

In the steering control device according to the aspect, in a situation in which a vehicle speed is a second vehicle speed determined to correspond to the second state after change from a first vehicle speed determined to correspond to the first state, the processing circuit may calculate the calculational hysteresis component enabling a value of the calculational hysteresis component at a timing of the change from the first vehicle speed to be maintained.

With this configuration, it is possible to achieve optimization with regard to a situation in which the value of the calculational hysteresis component is maintained, through an approach using the vehicle speed.

In the steering control device according to the aspect, the processing circuit may be configured to calculate a vehicle speed coefficient changing according to a vehicle speed such that the vehicle speed is reflected in the calculational hysteresis component when the first hysteresis characteristic or the second hysteresis characteristic is added to the torque component; and in a situation in which the calculated vehicle speed coefficient is a second vehicle speed coefficient calculated at a second vehicle speed determined to correspond to the second state after change from a first vehicle speed coefficient calculated at a first vehicle speed determined to correspond to the first state, the processing circuit may calculate the calculational hysteresis component enabling a value of the calculational hysteresis component at a timing of the change from the first vehicle speed coefficient to be maintained.

With this configuration, it is possible to achieve optimization with regard to a situation in which the value of the calculational hysteresis component is maintained through an approach using the vehicle speed coefficient changing according to the vehicle speed.

With the steering control device according to the aspect of the disclosure, it is possible to curb deterioration in a feeling of steering.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
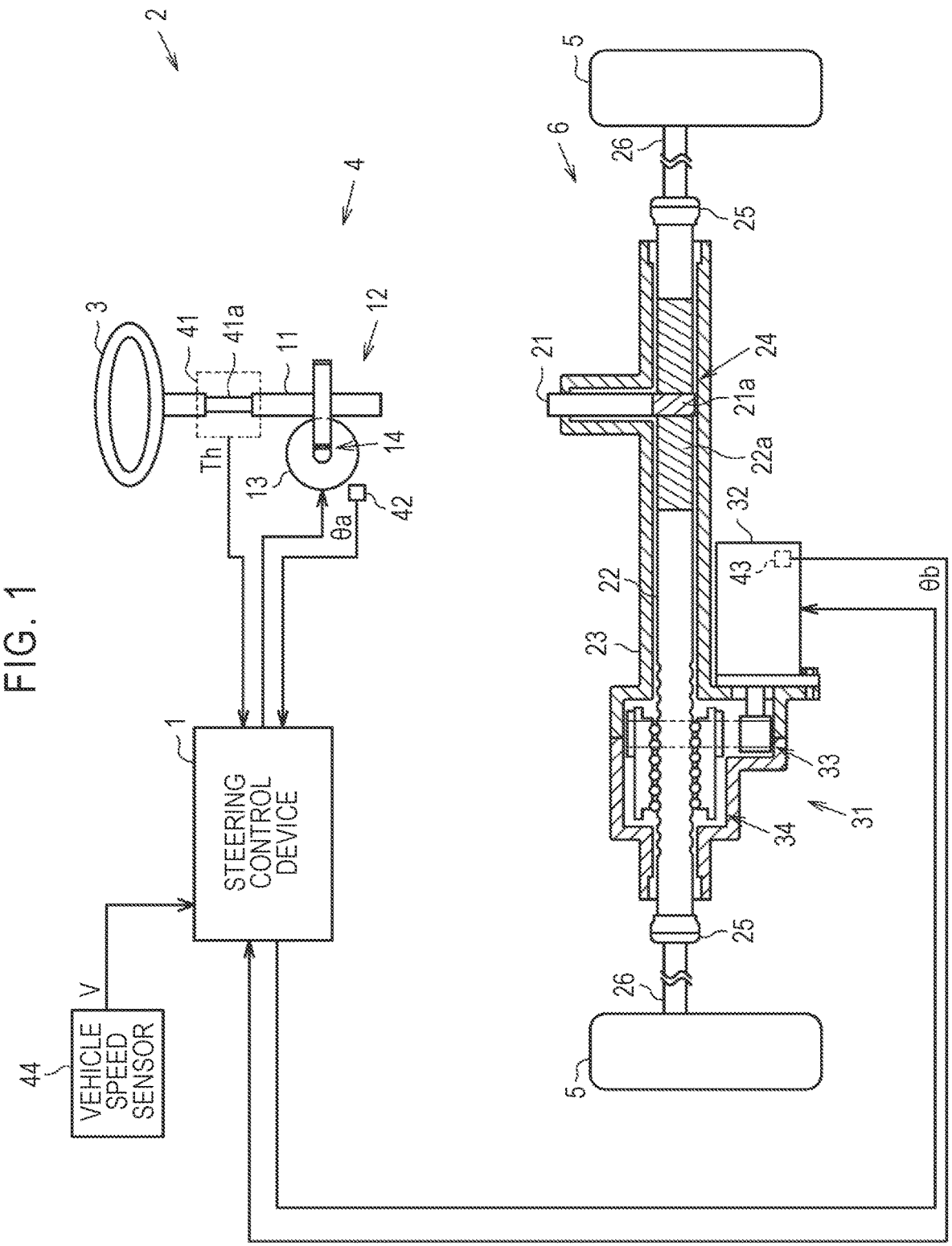
FIG. 1 is a diagram schematically illustrating a configuration of a steer-by-wire steering system according to a first embodiment.

A steering control device according to a first embodiment will be described below with reference to the accompanying drawings. As illustrated in FIG. 1, a steering system 2 of a vehicle which is controlled by a steering control device 1 is configured as a steer-by-wire steering system. The steering system 2 includes a steering unit 4 that is steered by a driver using a steering wheel 3 and a turning unit 6 that turns turning wheels 5 according to steering that is input to the steering unit 4 by a driver.

The steering unit 4 includes a steering shaft 11 and a steering-side actuator 12. The steering shaft 11 is connected to the steering wheel 3. The steering-side actuator 12 includes a steering-side motor 13 that serves as a drive source and a steering-side speed reduction mechanism 14. The steering-side motor 13 applies a steering reaction force, which is a force against steering, to the steering wheel 3 via the steering shaft 11. The steering-side motor 13 is connected to the steering shaft 11, for example, via the steering-side speed reduction mechanism 14 configured as a worm and wheel. For example, a three-phase brushless motor is employed as the steering-side motor 13 according to this embodiment.

The turning unit 6 includes a pinion shaft 21, a rack shaft 22 that is a turning shaft connected to the pinion shaft 21, and a rack housing 23. The pinion shaft 21 and the rack shaft 22 are connected to each other with a predetermined crossing angle. A rack and pinion mechanism 24 is configured by causing pinion teeth 21a formed in the pinion shaft 21 and rack teeth 22a formed in the rack shaft 22 to engage with each other. The rack and pinion mechanism 24 is accommodated in the rack housing 23. An end of the pinion shaft 21, which is opposite to an end connected to the rack shaft 22, protrudes from the rack housing 23. Both ends of the rack shaft 22 protrude from respective ends of the rack housing 23 in an axial direction. Tie rods 26 are respectively connected to both ends of the rack shaft 22 via rack ends 25 each of which is formed of a ball joint. The distal ends of the tie rods 26 are connected to knuckles (not illustrated) to which the right and left turning wheels 5 are assembled.

The turning unit 6 includes a turning-side actuator 31 that applies a turning force for turning the turning wheels 5 to the rack shaft 22. The turning-side actuator 31 includes a turning-side motor 32 serving as a drive source, a transmission mechanism 33, and a conversion mechanism 34. The turning-side motor 32 applies a turning force for turning the turning wheels 5 to the rack shaft 22 via the transmission mechanism 33 and the conversion mechanism 34. The turning-side motor 32 transmits rotation to the conversion mechanism 34 via the transmission mechanism 33 that is configured as, for example, a belt transmission mechanism. The transmission mechanism 33 converts a rotational motion of the turning-side motor 32 to a reciprocating motion of the rack shaft 22 via the conversion mechanism 34 that is configured as, for example, a ball screw mechanism.

In the steering system 2 having the aforementioned configuration, a turning angle of the turning wheels 5 is changed by applying a motor torque as the turning force from the turning-side actuator 31 to the rack shaft 22 according to a driver's steering operation. At this time, a steering reaction force against the driver's steering is applied to the steering wheel 3 from the steering-side actuator 12. That is, in the steering system 2, a steering torque Th required for steering the steering wheel 3 is changed by the steering reaction force which is a motor torque applied from the steering-side actuator 12.

The reason why the pinion shaft 21 is provided is that the rack shaft 22 is supported along with the pinion shaft 21 in the rack housing 23. That is, by a support mechanism (not illustrated) which is provided in the steering system 2, the rack shaft 22 is supported to be movable in the axial direction thereof and is pressed toward the pinion shaft 21. Accordingly, the rack shaft 22 is supported in the rack housing 23. Another support mechanism that supports the rack shaft 22 in the rack housing 23 without using the pinion shaft 21 may be provided.

An electrical configuration of the steering system 2 will be described below. As illustrated in FIG. 1, the steering-side motor 13 and the turning-side motor 32 are connected to a steering control device 1. The steering control device 1 controls operations of the steering-side motor 13 and the turning-side motor 32.

A torque sensor 41, a steering-side rotation angle sensor 42, a turning-side rotation angle sensor 43, and a vehicle speed sensor 44 are connected to the steering control device 1. The torque sensor 41 detects a steering torque Th which is a value indicating a torque applied to the steering shaft 11 according to a driver's steering operation. The torque sensor 41 is provided in a part of the steering shaft 11 that is closer to the steering wheel 3 than the steering-side speed reduction mechanism 14 is. The torque sensor 41 detects the steering torque Th based on an amount of torsion of a torsion bar 41a provided in a part of the steering shaft 11. For example, the steering torque Th is detected as a positive value when steering to the right is performed and is calculated as a negative value when steering to the left is performed.

The steering-side rotation angle sensor 42 detects a rotation angle $\theta a$ which is an angle of a rotation shaft of the steering-side motor 13 as an angle in a range of 360 degrees. The steering-side rotation angle sensor 42 is provided in the steering-side motor 13. The rotation angle $\theta a$ of the steering-side motor 13 is used to calculate a steering angle $\theta s$. The steering-side motor 13 and the steering shaft 11 operate in conjunction with each other via the steering-side speed reduction mechanism 14. Accordingly, there is a correlation between the rotation angle $\theta a$ of the steering-side motor 13 and a rotation angle of the steering shaft 11, and thus, there is a correlation between the rotation angle $\theta a$ of the steering-side motor 13 and the steering angle $\theta s$ which is a rotation angle of the steering wheel 3. Accordingly, the steering angle $\theta s$ can be calculated based on the rotation angle $\theta a$ of the steering-side motor 13. For example, the rotation angle $\theta a$ is detected as a positive value when steering to the right is performed and is detected as a negative value when steering to the left is performed.

The turning-side rotation angle sensor 43 detects a rotation angle $\theta b$ which is an angle of a rotation shaft of the turning-side motor 32 as an angle in a range of 360 degrees. The turning-side rotation angle sensor 43 is provided in the turning-side motor 32. The rotation angle $\theta b$ of the turning-side motor 32 is used to calculate a pinion angle $\theta p$. The turning-side motor 32 and the pinion shaft 21 operate in conjunction with each other via the transmission mechanism 33, the conversion mechanism 34, and the rack and pinion mechanism 24. Accordingly, there is a correlation between the rotation angle $\theta b$ of the turning-side motor 32 and the pinion angle $\theta p$ which is a rotation angle of the pinion shaft 21. Accordingly, the pinion angle $\theta p$ can be calculated based on the rotation angle $\theta b$ of the turning-side motor 32. The pinion shaft 21 engages with the rack shaft 22. Accordingly, there is also a correlation between the pinion angle $\theta p$ and an amount of movement of the rack shaft 22. That is, the pinion angle $\theta p$ is a value in which the turning angle of the turning wheels 5 is reflected. For example, the rotation angle $\theta b$ is detected as a positive value when steering to the right is performed and is detected as a negative value when steering to the left is performed.

The vehicle speed sensor 44 detects a vehicle speed V which is set as information indicating a travel speed of the vehicle. A function of the steering control device 1 will be described below. The steering control device 1 includes a central processing unit (CPU) and a memory which are not illustrated. The steering control device 1 performs various kinds of control by causing the CPU to execute a program stored in the memory at intervals of a predetermined calculation cycle.

Figure 2:
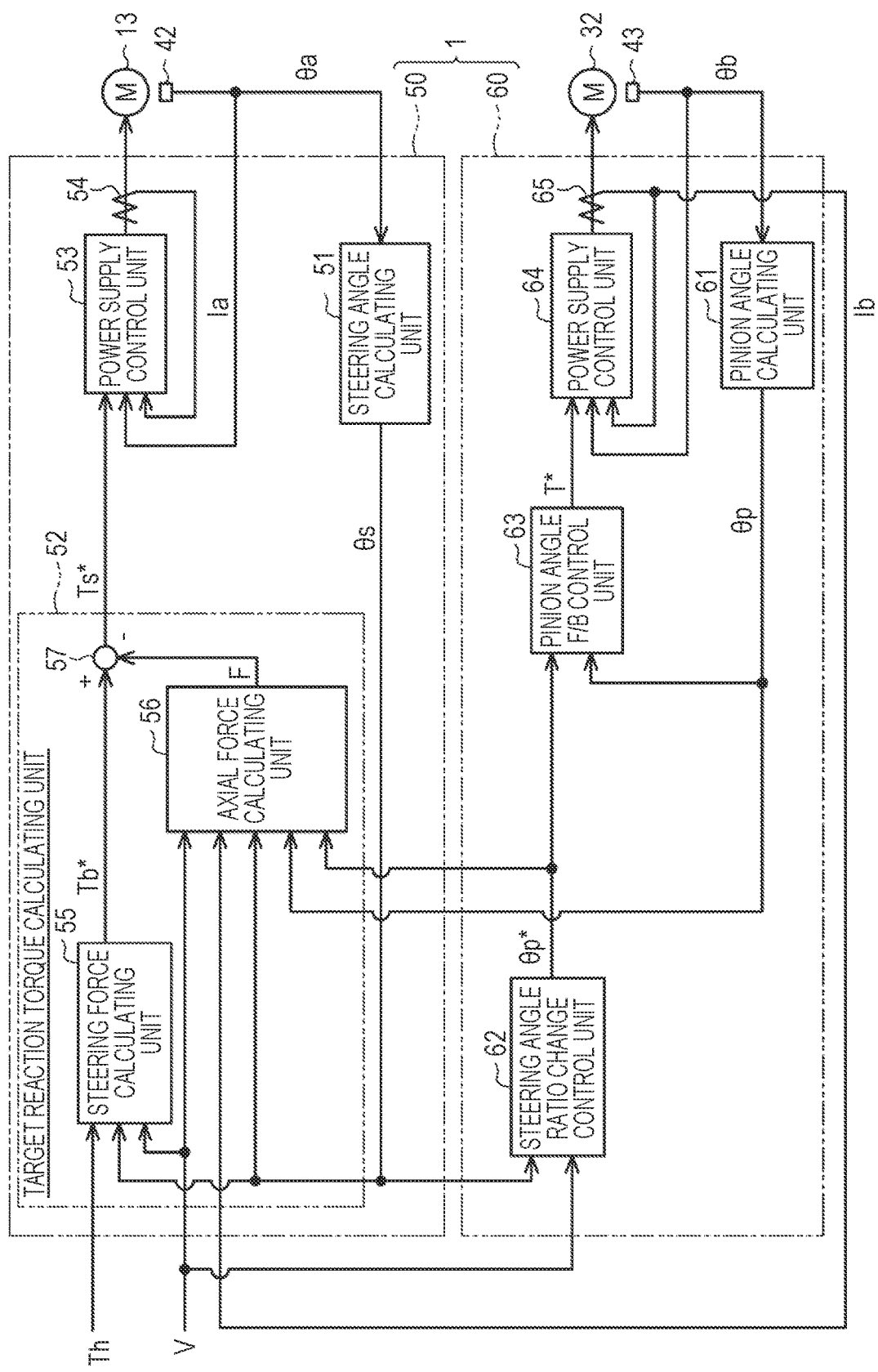
FIG. 2 is a block diagram illustrating a functional configuration of a steering control device according to the first embodiment.

As illustrated in FIG. 2, the steering control device 1 includes a steering-side control unit 50 that controls supply of electric power to the steering-side motor 13. The steering-side control unit 50 includes a steering-side current sensor 54. The steering-side current sensor 54 detects a steering-side actual current value Ia which is acquired from values of phase currents of the steering-side motor 13 flowing in connection lines between the steering-side control unit 50 and phase motor coils of the steering-side motor 13. The steering-side current sensor 54 acquires, as a current, a voltage drop of a shunt resistor connected to the source side of each switching element in an inverter (not illustrated) provided to correspond to the steering-side motor 13. In FIG. 2, for the purpose of convenience of description, one of the phase connection lines and one of the phase current sensors are collectively illustrated.

The steering control device 1 includes a turning-side control unit 60 that controls supply of electric power to the turning-side motor 32. The turning-side control unit 60 includes a turning-side current sensor 65. The turning-side current sensor 65 detects a turning-side actual current value Ib which is acquired from values of phase currents of the turning-side motor 32 flowing in connection lines between the turning-side control unit 60 and phase motor coils of the turning-side motor 32. The turning-side current sensor 65 acquires, as a current, a voltage drop of a shunt resistor connected to the source side of each switching element in an inverter (not illustrated) provided to correspond to the turning-side motor 32. In FIG. 2, for the purpose of convenience of description, one of the phase connection lines and one of the phase current sensors are collectively illustrated.

The steering-side control unit 50 will be described below. The steering torque Th, the vehicle speed V, the rotation angle $\theta a$, the turning-side actual current value Ib, the pinion angle $\theta p$, and a target pinion angle $\theta p^*$ which will be described later are input to the steering-side control unit 50. The steering-side control unit 50 controls supply of electric power to the steering-side motor 13 based on the steering torque Th, the vehicle speed V, the rotation angle $\theta a$, the turning-side actual current value Ib, the pinion angle $\theta p$, and the target pinion angle $\theta p^*$.

The steering-side control unit 50 includes a steering angle calculating unit 51, a target reaction torque calculating unit 52, and a power supply control unit 53. The rotation angle $\theta a$ is input to the steering angle calculating unit 51. The steering angle calculating unit 51 converts the rotation angle $\theta a$ to a total angle in a range including a range exceeding 360 degrees, for example, by counting the number of rotations of the steering-side motor 13 from a steering neutral point which is a position of the steering wheel 3 when the vehicle moves straight ahead. The steering angle calculating unit 51 calculates the steering angle $\theta s$ by multiplying the total angle acquired by conversion, by a conversion factor based on a rotation speed ratio of the steering-side speed reduction mechanism 14. The acquired steering angle $\theta s$ is output to the target reaction torque calculating unit 52. The steering angle $\theta s$ is output to the turning-side control unit 60, that is, a steering angle ratio change control unit 62 which will be described later.

The steering torque Th, the vehicle speed V, the turning-side actual current value Tb, the steering angle $\theta s$, the pinion angle $\theta p$, and the target pinion angle $\theta p^*$ which will be described later are input to the target reaction torque calculating unit 52. The target reaction torque calculating unit 52 calculates a target reaction torque Ts* based on the steering torque Th, the vehicle speed V, the turning-side actual current value Tb, the steering angle $\theta s$, the pinion angle $\theta p$, and the target pinion angle $\theta p^*$. The target reaction torque Ts* is a reaction control value that is a target value of the steering reaction force of the steering wheel 3 which is to be generated by the steering-side motor 13. In this embodiment, the target reaction torque Ts* is an example of a torque command value, and the target reaction torque calculating unit 52 is an example of a torque command value calculating unit.

Specifically, the target reaction torque calculating unit 52 includes a steering force calculating unit 55 and an axial force calculating unit 56. The steering torque Th, the steering angle $\theta s$, and the vehicle speed V are input to the steering force calculating unit 55. The steering force calculating unit 55 calculates a steering force Tb* based on the steering torque Th, the steering angle $\theta s$, and the vehicle speed V. The steering force Tb* acts in the same direction as a driver's steering direction.

Figure 3:
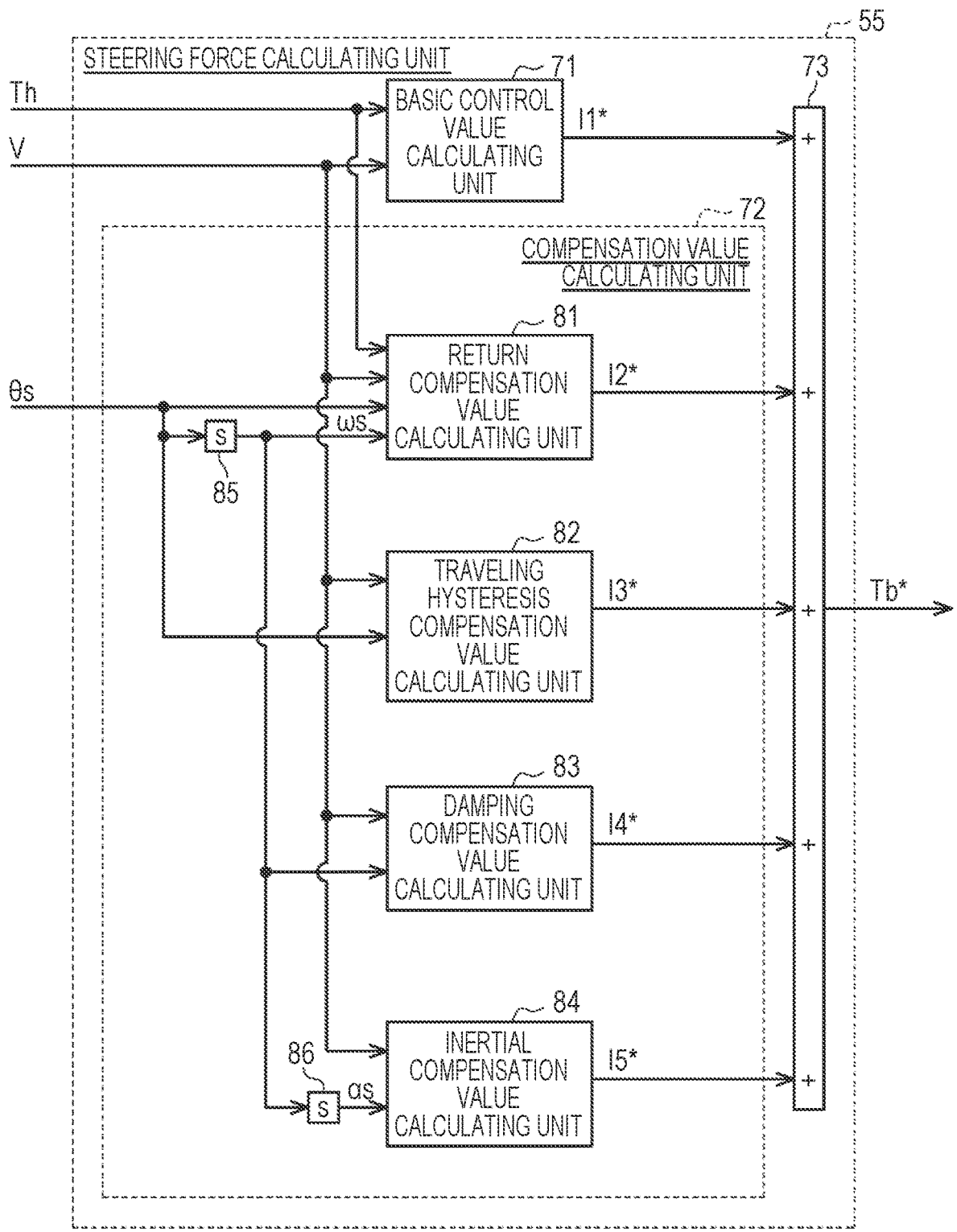
FIG. 3 is a block diagram illustrating a functional configuration of a steering force calculating unit according to the first embodiment.

Specifically, as illustrated in FIG. 3, the steering force calculating unit 55 includes a basic control value calculating unit 71 and a compensation value calculating unit 72. The steering torque Th and the vehicle speed V are input to the basic control value calculating unit 71. The basic control value calculating unit 71 calculates a basic control value I1* based on the steering torque Th and the vehicle speed V. The basic control value I1* is a control value which is calculated in association with steering of the steering wheel 3. The basic control value I1* is a base component of the steering force Tb* and is set such that steering of the steering wheel 3 exhibits desired characteristics. For example, the basic control value calculating unit 71 calculates the basic control value I1* such that the absolute value thereof increases as the absolute value of the steering torque Th increases and as the vehicle speed V decreases in consideration of an assist gradient which is a rate of change of the basic control value I1* with respect to change of the steering torque Th. The acquired basic control value I1* is output to an adder 73.

The steering torque Th, the vehicle speed V, and the steering angle $\theta s$ are input to the compensation value calculating unit 72. The compensation value calculating unit 72 calculates a return compensation value I2*, a traveling hysteresis compensation value I3*, a damping compensation value I4*, and an inertial compensation value I5* based on the steering torque Th, the vehicle speed V, and the steering angle $\theta s$. Various kinds of compensation values include a phase delay compensation value for performing compensation for a phase of the steering torque Th such that the phase is delayed and a phase advance compensation value for performing compensation for a phase of the basic control value I1* such that the phase advances, which are not illustrated, in addition to specific compensation values such as the compensation values I2* to I5*. The phase delay compensation value is for adjusting an assist gradient. The phase advance compensation value is for stabilizing the system by curbing resonance characteristics. The various kinds of compensation values are compensation values for performing compensation such that the operation of the steering wheel 3 which is realized based on the basic control value I1* exhibits desired characteristics.

The compensation value calculating unit 72 includes a return compensation value calculating unit 81, a traveling hysteresis compensation value calculating unit 82, a damping compensation value calculating unit 83, and an inertial compensation value calculating unit 84.

The steering torque Th, the vehicle speed V, the steering angle θs, and a steering velocity ωs which is acquired by a differentiator 85 by differentiating the steering angle θs are input to the return compensation value calculating unit 81. The return compensation value calculating unit 81 calculates the return compensation value I2* based on the steering torque Th, the vehicle speed V, the steering angle θs, and the steering velocity ωs. The return compensation value I2* is for performing compensation for a return operation of the steering wheel 3 for returning the steering wheel 3 to the steering neutral point. A self-aligning torque of the turning wheels 5 is associated with the return operation of the steering wheel 3, and excess and deficiency of the self-aligning torque are compensated for by the return compensation value I2*. The return compensation value I2* is for generating a torque in a direction in which the steering wheel 3 is returned to the steering neutral point. The acquired return compensation value I2* is output to the adder 73.

The vehicle speed V and the steering angle θs are input to the traveling hysteresis compensation value calculating unit 82. The traveling hysteresis compensation value calculating unit 82 calculates the traveling hysteresis compensation value I3* based on the vehicle speed V and the steering angle θs. The traveling hysteresis compensation value I3* is for performing compensation such that hysteresis characteristics due to friction at the time of operation of the steering wheel 3 is optimized. A mechanical friction component of the vehicle in which the steering system 2 is mounted is associated with the hysteresis characteristics due to friction at the time of operation of the steering wheel 3, and compensation is performed to optimize the hysteresis characteristics due to the mechanical friction component, using the traveling hysteresis compensation value I3*. In this embodiment, the traveling hysteresis compensation value I3* is used to perform compensation such that the hysteresis characteristics due to friction at the time of operation of the steering wheel 3 are optimized particularly in a traveling state of the vehicle that does not include a stopped state. The traveling state of the vehicle that does not include a stopped state is, for example, a state in which the vehicle is traveling at a middle or high speed equal to or higher than 10 km/h. The traveling hysteresis compensation value I3* has hysteresis characteristics with respect to change of the steering angle θs. The acquired traveling hysteresis compensation value I3* is output to the adder 73.

The vehicle speed V and the steering velocity ωs are input to the damping compensation value calculating unit 83. The damping compensation value calculating unit 83 calculates the damping compensation value I4* based on the vehicle speed V and the steering velocity ωs. The damping compensation value I4* is for performing compensation such that minute vibration generated in the steering wheel 3 is reduced. A viscosity component of the steering system 2, particularly, a viscosity component of the turning-side actuator 31, is associated with reduction of minute vibration generated in the steering wheel 3, and compensation is performed to reduce minute vibration generated in the steering wheel 3, using the damping compensation value I4*. The damping compensation value I4* is for generating a torque in a direction opposite to a direction in which the steering velocity ωs is generated at that time. The acquired damping compensation value I4* is output to the adder 73.

The vehicle speed V and a steering acceleration αs acquired from a differentiator 86 by differentiating the steering velocity ωs are input to the inertial compensation value calculating unit 84. The inertial compensation value calculating unit 84 calculates the inertial compensation value I5* based on the vehicle speed V and the steering acceleration αs. The inertial compensation value I5* is for performing compensation such that a feeling of being caught at the start time of steering of the steering wheel 3 and a feeling of overshoot at the end time of steering are curbed. An inertial component of the steering system 2 is associated with curbing of the feeling of being caught at the start time of steering of the steering wheel 3 and the feeling of overshoot at the end time of steering, and compensation is performed to curb the feeling of being caught at the start time of steering and the feeling of overshoot at the end time of steering, using the inertial compensation value I5*. The inertial compensation value I5* is for generating a torque in a direction in which the steering acceleration αs is generated when the absolute value of the steering acceleration αs increases, for example, at the start time of steering of the steering wheel 3. The inertial compensation value I5* is for generating a torque in a direction opposite to the direction in which the steering acceleration αs is generated when the absolute value of the steering acceleration αs decreases, for example, at the end time of steering of the steering wheel 3. The acquired inertial compensation value I5* is output to the adder 73.

The adder 73 calculates a steering force Tb* by adding the compensation values I2* to I5* to the basic control value I1*. In addition to the compensation values I2* to I5*, a phase delay compensation value, a phase advance compensation value, or the like is added to and reflected in the basic control value I1*. As illustrated in FIG. 2, the acquired steering force Tb* is output to a subtractor 57. The steering force Tb* acts in the same direction as a driver's steering direction. The steering force Tb* is calculated as a value with the dimension of a torque (N·m).

As illustrated in FIG. 2, the vehicle speed V, the steering angle θs, the turning-side actual current value Ib, the pinion angle θp, and the target pinion angle θp* which will be described later are input to the axial force calculating unit 56. The axial force calculating unit 56 calculates an axial force F applied to the rack shaft 22 via the turning wheels 5 based on the vehicle speed V, the steering angle θs, the turning-side actual current value Ib, the pinion angle θp, and the target pinion angle θp*. The axial force F is calculated as a value with the dimension (N·m) of a torque. The axial force F acts in a direction opposite to a driver's steering direction. The subtractor 57 calculates a target reaction torque Ts* by subtracting the axial force F from the steering force Tb*. The acquired target reaction torque Ts* is output to the power supply control unit 53.

The target reaction torque Ts*, the rotation angle θa, and the steering-side actual current value Ia are input to the power supply control unit 53. The power supply control unit 53 calculates a current command value Ia* for the steering-side motor 13 based on the target reaction torque Ts*. The power supply control unit 53 calculates a difference between the current command value Ia* and a current value on a d-q coordinate system acquired by converting the steering-side actual current value Ia based on the rotation angle θa, and controls supply of electric power to the steering-side motor 13 such that the difference is cancelled out. The steering-side motor 13 generates a torque corresponding to the target reaction torque Ts*. Accordingly, it is possible to give an appropriate feeling of response to a driver.

The turning-side control unit 60 will be described below. The steering angle θs, the vehicle speed V, and the rotation angle θb are input to the turning-side control unit 60. The turning-side control unit 60 controls supply of electric power to the turning-side motor 32 based on the steering angle θs, the vehicle speed V. and the rotation angle θb.

The turning-side control unit 60 includes a pinion angle calculating unit 61, a steering angle ratio change control unit 62, a pinion angle feedback control unit ("pinion angle F/B control unit" in FIG. 2) 63, and a power supply control unit 64.

The rotation angle θb is input to the pinion angle calculating unit 61. The pinion angle calculating unit 61 converts the rotation angle θb to a total angle in a range including a range exceeding 360 degrees, for example, by counting the number of rotations of the turning-side motor 32 from a rack neutral point which is a position of the rack shaft 22 when the vehicle travels straight ahead. The pinion angle calculating unit 61 calculates the pinion angle θp which is an actual rotation angle of the pinion shaft 21 by multiplying the total angle acquired by conversion, by a conversion factor based on a speed reduction ratio of the transmission mechanism 33, a lead of the conversion mechanism 34, and a rotation speed ratio of the rack and pinion mechanism 24. For example, the pinion angle θp is calculated as a positive value when it is an angle on the right side of the rack neutral point and is calculated as a negative value when it is an angle on the left side of the rack neutral point. The acquired pinion angle θp is output to the pinion angle feedback control unit 63. The pinion angle θp is output to the steering-side control unit 50, that is, the axial force calculating unit 56 of the target reaction torque calculating unit 52.

The vehicle speed V and the steering angle θs are input to the steering angle ratio change control unit 62. The steering angle ratio change control unit 62 calculates the target pinion angle θp* by adding an amount of adjustment to the steering angle θs. The steering angle ratio change control unit 62 changes an amount of adjustment for changing a steering angle ratio which is a ratio of the target pinion angle θp* to the steering angle θs, according to the vehicle speed V. For example, the amount of adjustment is changed such that change of the target pinion angle θp* with respect to change of the steering angle θs is larger when the vehicle speed V is low than that when the vehicle speed V is high. There is a correlation between the steering angle θs and the target pinion angle θp*. The pinion angle θp is controlled based on the target pinion angle θp*. Accordingly, there is also a correlation between the steering angle θs and the pinion angle θp.

The target pinion angle θp* and the pinion angle θp are input to the pinion angle feedback control unit 63. The pinion angle feedback control unit 63 performs PID control using a proportional term, an integral term, and a differential term, as feedback control for the pinion angle θp such that the pinion angle θp conforms to the target pinion angle θp*. That is, the pinion angle feedback control unit 63 calculates a difference between the target pinion angle θp* and the pinion angle θp and calculates a turning force command value T* which is a target control value for the turning force such that the difference is cancelled out.

The turning force command value T*, the rotation angle θb, and the turning-side actual current value Ib are input to the power supply control unit 64. The power supply control unit 64 calculates a current command value Ib* for the turning-side motor 32 based on the turning force command value T*. The power supply control unit 64 calculates a difference between the current command value Ib* and a current value on the d-q coordinate system acquired by converting the turning-side actual current value Ib based on the rotation angle θb, and controls supply of electric power to the turning-side motor 32 such that the difference is cancelled out. Accordingly, the turning-side motor 32 rotates by an angle corresponding to the turning force command value T*.

Figure 4:
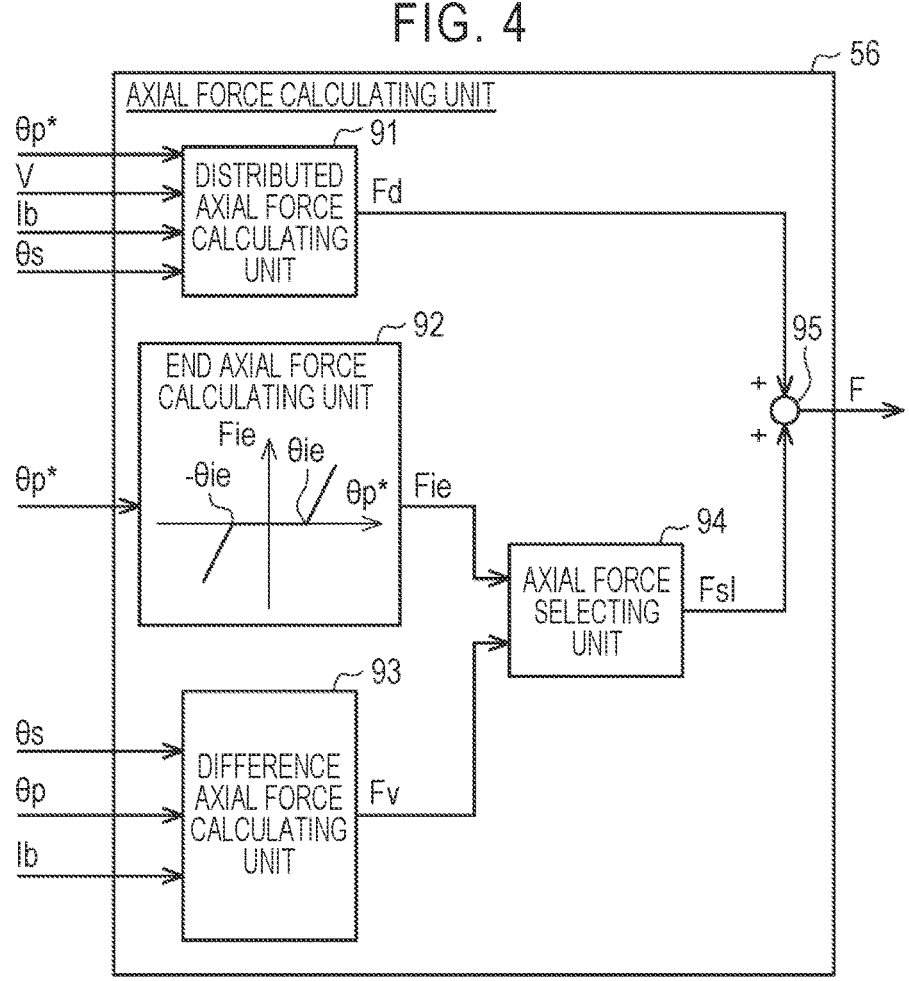
FIG. 4 is a block diagram illustrating a functional configuration of an axial force calculating unit according to the first embodiment.

The function of the axial force calculating unit 56 will be described below in detail. As illustrated in FIG. 4, the axial force calculating unit 56 includes a distributed axial force calculating unit 91, an end axial force calculating unit 92, a difference axial force calculating unit 93, and an axial force selecting unit 94.

The distributed axial force calculating unit 91 calculates a distributed axial force Fd based on an axial force acting on the rack shaft 22. The distributed axial force Fd corresponds to a calculational axial force which is obtained by estimating the axial force acting on the rack shaft 22 by summing an angle axial force Fr and a current axial force Fi which will be described later at distribution proportions thereof such that the axial force acting on the rack shaft 22 via the turning wheels 5 is appropriately reflected. The acquired distributed axial force Fd is output to an adder 95. In this embodiment, the distributed axial force Fd is an example of a torque component.

The end axial force calculating unit 92 calculates an end axial force Fie for transmitting, to a driver, a situation in which a steering limit of the steering wheel 3, that is, a turning limit of the turning wheels 5, has been reached. The end axial force Fie corresponds to a force against steering of the steering wheel 3 such that additional steering of the steering wheel 3 to a side exceeding a steering angle limit corresponding to the steering limit is limited when the absolute value of the steering angle θs approaches the steering angle limit.

The target pinion angle θp* is input to the end axial force calculating unit 92. The end axial force calculating unit 92 calculates the end axial force Fie based on the target pinion angle θp*. Specifically, the end axial force calculating unit 92 includes an end axial force map in which a relationship between the target pinion angle θp* and the end axial force Fie is defined, and calculates the end axial force Fie using the map and using the target pinion angle θp* as an input. When the absolute value of the target pinion angle θp* is equal to or less than a threshold angle θie, the end axial force calculating unit 92 calculates the end axial force Fie as "0." When the absolute value of the target pinion angle θp* is greater than the threshold angle θie, the end axial force calculating unit 92 determines that the steering angle θs exceeds the steering angle limit and calculates the end axial force Fie such that the absolute value thereof is greater than "0." The end axial force Fie is set such that the absolute value thereof becomes large to such an extent that additional steering of the steering wheel 3 is not possible with a human hand when the absolute value of the target pinion angle θp* increases to a certain large value exceeding the threshold angle θie. The acquired end axial force Fie is output to the axial force selecting unit 94.

The difference axial force calculating unit 93 calculates a difference axial force Fv for transmitting, to a driver, a situation in which a relationship between the steering state of the steering wheel 3 and the turning state of the turning wheels 5 based on the steering angle ratio changes when such a change occurs. An example of the case in which the relationship between the steering state of the steering wheel 3 and the turning state of the turning wheels 5 based on the steering angle ratio changes is a situation in which the turning wheels 5 come into contact with an obstacle such as a curbstone. In this case, the turning wheels 5 cannot be turned to one side where the obstacle is located, but there is a likelihood that the steering wheel 3 will be steered to the one side beyond a stop position of the steering wheel 3 corresponding to a stop position of the turning wheels 5. This is because a power transmission path between the steering unit 4 and the turning unit 6 is cut off. Another example of the case in which the relationship between the steering state of the steering wheel 3 and the turning state of the turning wheels 5 based on the steering angle ratio changes is a situation in which the operation of the turning-side motor 32 is limited for protection from overheating and thus the correlation between the steering angle θs and the turning angle collapses. This is because the pinion angle θp is less likely to conform to the target pinion angle θp*. The difference axial force Fv corresponds to a force against steering of the steering wheel 3 such that additional steering of the steering wheel 3 is limited when the turning wheels 5 come into contact with an obstacle such as a curbstone. The difference axial force Fv corresponds to a force against steering of the steering wheel 3 such that the steering of the steering wheel 3 is limited to secure conformability (followability) of the pinion angle θp to the target pinion angle θp* when the operation of the turning-side motor 32 is limited for protection from overheating.

The steering angle θs, the pinion angle θp, and the turning-side actual current value Ib are input to the difference axial force calculating unit 93. The difference axial force calculating unit 93 calculates a converted angle by adding an amount of adjustment to the pinion angle θp. The converted angle is an angle obtained by converting the pinion angle θp which is expressed as an index value of the turning angle such that it is expressed as an index value of the steering angle according to the steering angle ratio. The difference axial force calculating unit 93 changes the amount of adjustment according to the vehicle speed V such that a calculation rule defined by the steering angle ratio change control unit 62 changes to a calculation rule in which a relationship between an input and an output is inverted. The difference axial force calculating unit 93 calculates the difference axial force Fv based on a difference obtained by subtracting the converted angle from the steering angle θs. Specifically, the difference axial force calculating unit 93 includes a difference axial force map in which a relationship between an absolute value of the difference and the difference axial force Fv is defined, and calculates the difference axial force Fv using the map and using the difference as an input. The difference axial force calculating unit 93 sets the sign of the difference axial force Fv based on the turning-side actual current value Ib. That is, the difference axial force calculating unit 93 sets the difference axial force Fv to be positive when the turning-side actual current value Ib is a positive value including a zero value and sets the difference axial force Fv to be negative when the turning-side actual current value Ib is a negative value. The acquired difference axial force Fv is output to the axial force selecting unit 94.

The end axial force Fie and the difference axial force Fv are input to the axial force selecting unit 94. The axial force selecting unit 94 selects an axial force having the larger absolute value out of the end axial force Fie and the difference axial force Fv, and calculates the selected axial force as a selected axial force Fs1. The adder 95 calculates the axial force F by adding the selected axial force Fs1 to the distributed axial force Fd. As illustrated in FIG. 2, the acquired axial force F is output to the subtractor 57. The subtractor 57 calculates the target reaction torque Ts* by subtracting the axial force F from the steering force Tb*. The acquired target reaction torque Ts* is output to the power supply control unit 53.

Figure 5:
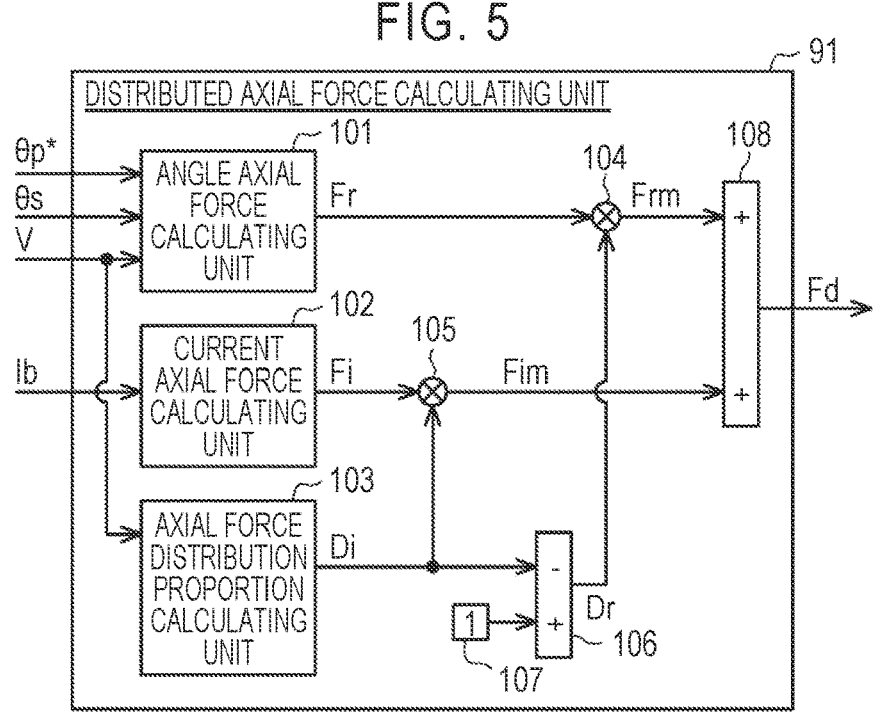
FIG. 5 is a block diagram illustrating a functional configuration of a distributed axial force calculating unit according to the first embodiment.

The function of the distributed axial force calculating unit 91 will be described below. As illustrated in FIG. 5, the distributed axial force calculating unit 91 includes an angle axial force calculating unit 101, a current axial force calculating unit 102, and an axial force distribution proportion calculating unit 103.

The target pinion angle θp*, the steering angle θs, and the vehicle speed V are input to the angle axial force calculating unit 101. The angle axial force calculating unit 101 calculates an angle axial force Fr based on the target pinion angle θp*, the steering angle θs, and the vehicle speed V. The angle axial force Fr is an ideal value of an axial force which is defined by a model for a vehicle which is arbitrarily set. The angle axial force Fr is calculated as an axial force in which road surface information is not reflected. Road surface information is information such as fine unevenness that does not affect a behavior in the lateral direction of the vehicle or a stepped portion affecting the behavior in the lateral direction of the vehicle. For example, the angle axial force calculating unit 101 calculates the angle axial force Fr such that the absolute value thereof increases as the absolute value of the target pinion angle θp* increases. The angle axial force calculating unit 101 calculates the angle axial force Fr such that the absolute value thereof increases as the vehicle speed V increases. The angle axial force Fr is calculated as a value with the dimension of a torque (N·m). The acquired angle axial force Fr is output to a multiplier 104. In this embodiment, the angle axial force Fr is an example of a torque component, and the angle axial force calculating unit 101 is an example of a torque component calculating unit.

The turning-side actual current value Ib is input to the current axial force calculating unit 102. The current axial force calculating unit 102 calculates the current axial force Fi based on the turning-side actual current value Ib. The current axial force Fi is an estimated value of an axial force actually acting on the rack shaft 22 that operates to turn the turning wheels 5, that is, an axial force which is actually transmitted to the rack shaft 22. The current axial force Fi is calculated as an axial force in which the road surface information is reflected. For example, the current axial force calculating unit 102 calculates the current axial force Fi based on the assumption that a torque applied to the rack shaft 22 by the turning-side motor 32 and a torque corresponding to a force applied to the rack shaft 22 via the turning wheels 5 are balanced. That is, the current axial force calculating unit 102 calculates the current axial force Fi such that the absolute value thereof increases as the absolute value of the turning-side actual current value Ib increases. The current axial force Fi is calculated as a value having the dimension of a torque (N·m). The acquired current axial force Fi is output to a multiplier 105.

The vehicle speed V is input to the axial force distribution proportion calculating unit 103. The axial force distribution proportion calculating unit 103 calculates an axial force distribution gain Di based on the vehicle speed V. The axial force distribution gain Di is a distribution proportion of the current axial force Fi when the angle axial force Fr and the current axial force Fi are summed at distribution proportions to acquire a distributed axial force Fd. The axial force distribution proportion calculating unit 103 includes an axial force distribution gain map in which a relationship between the vehicle speed V and the axial force distribution gain Di is defined, and calculates the axial force distribution gain Di using the map and using the vehicle speed V as an input. The current axial force Fi is multiplied by the acquired axial force distribution gain Di by the multiplier 105, and the resultant is output as a final current axial force Fim to an adder 108. The subtractor 106 calculates an axial force distribution gain Dr by subtracting the axial force distribution gain Di from "1" stored in a storage unit 107. The acquired axial force distribution gain Dr is output to the multiplier 104. The axial force distribution gain Dr is a distribution proportion of the angle axial force Fr when the distributed axial force Fd is acquired. That is, the axial force distribution gain Dr is calculated such that the sum with the axial force distribution gain Di is "1 (100%)." The distribution proportion includes the concept of zero value in which only one of the angle axial force Fr and the current axial force Fi is distributed (provided) to the distributed axial force Fd. The storage unit 107 is a predetermined storage area of a memory which is not illustrated.

The angle axial force Fr acquired from the angle axial force calculating unit 101 is multiplied by the acquired axial force distribution gain Dr by the multiplier 104, and the resultant is output as a final angle axial force Frm to the adder 108. The adder 108 calculates the distributed axial force Fd by adding the angle axial force Frm to the current axial force Fim (i.e., by summing the angle axial force Frm and the current axial force Fim). The distributed axial force Fd acts in a direction opposite to a driver's steering direction. The distributed axial force Fd is calculated as a value with the dimension of a torque (N·m). As illustrated in FIG. 4, the acquired distributed axial force Fd is output to the adder 95.

Figure 6:
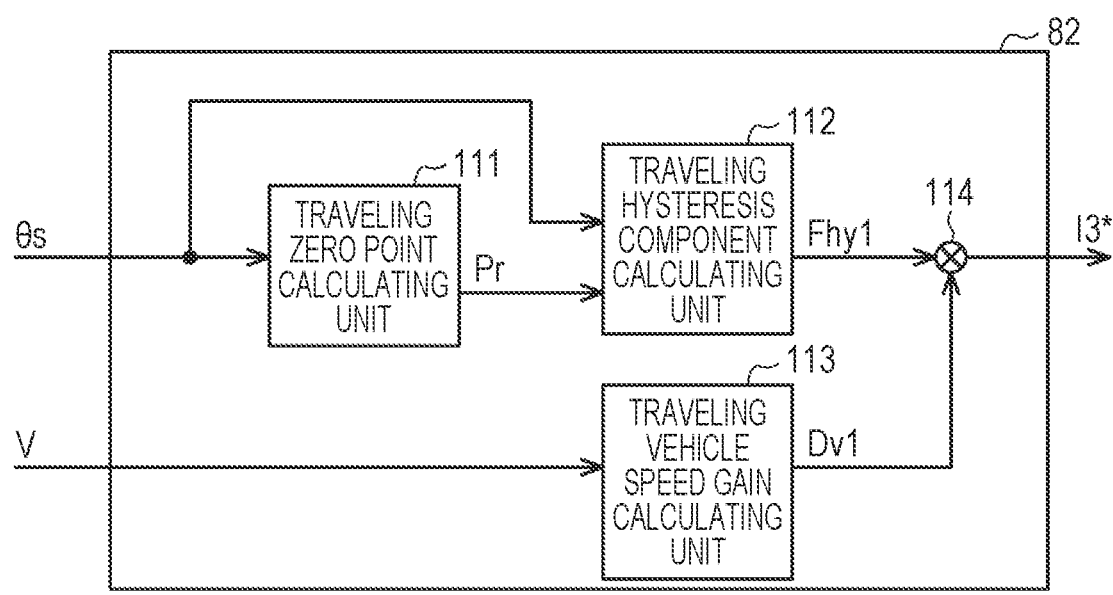
FIG. 6 is a block diagram illustrating a functional configuration of a traveling hysteresis component calculating unit according to the first embodiment.

The traveling hysteresis compensation value calculating unit 82 will be described below. As illustrated in FIG. 6, the traveling hysteresis compensation value calculating unit 82 includes a traveling zero point calculating unit 111, a traveling hysteresis component calculating unit 112, and a traveling vehicle speed gain calculating unit 113.

The steering angle θs is input to the traveling zero point calculating unit 111. The traveling zero point calculating unit 111 calculates a traveling zero point Pr used when the traveling hysteresis component calculating unit 112 calculates a traveling hysteresis component Fhy1 which will be described later, based on the steering angle θs. Specifically, when start of turn steering or start of return steering is determined, the traveling zero point calculating unit 111 calculates the steering angle θs at the position of start, as the traveling zero point Pr. The traveling zero point calculating unit 111 determines the start of turn steering or the start of return steering based on increase and/or decrease of the steering angle θs, that is, a sign of a steering velocity ωs acquired cy differentiating the steering angle θs. That is, the traveling zero point calculating unit 111 updates the traveling zero point Pr every time the start of turn steering or the start of return steering is determined.

In this embodiment, turn steering is steering in which the steering direction continues to be the same one direction. Return steering is steering in which the steering angle θs is in a predetermined slight range after the steering direction has been changed. For example, the traveling zero point calculating unit 111 determines that a time at which change of the steering angle θs is started from a state in which it is not changed, that is, a time at which change of the steering velocity ωs from the zero value to a positive or negative value is started, is the start of turn steering. The traveling zero point calculating unit 111 determines that a time at which change of the steering angle θs between increase and decrease, that is, change of the sign of the steering velocity ωs between a positive value and a negative value, is started during the turn steering is the start of return steering. The traveling zero point calculating unit 111 determines that a time at which the steering angle θs has changed by an angle corresponding to a predetermined range after the start of return steering has been determined is the start of turn steering.

The acquired traveling zero point Pr is output to the traveling hysteresis component calculating unit 112. The steering angle θs and the traveling zero point Pr are input to the traveling hysteresis component calculating unit 112. The traveling hysteresis component calculating unit 112 calculates a traveling hysteresis component Fhy1 which is a component added to the basic control value I1* such that the steering force Tb* has hysteresis characteristics, based on the steering angle θs and the traveling zero point Pr.

Figure 7A:
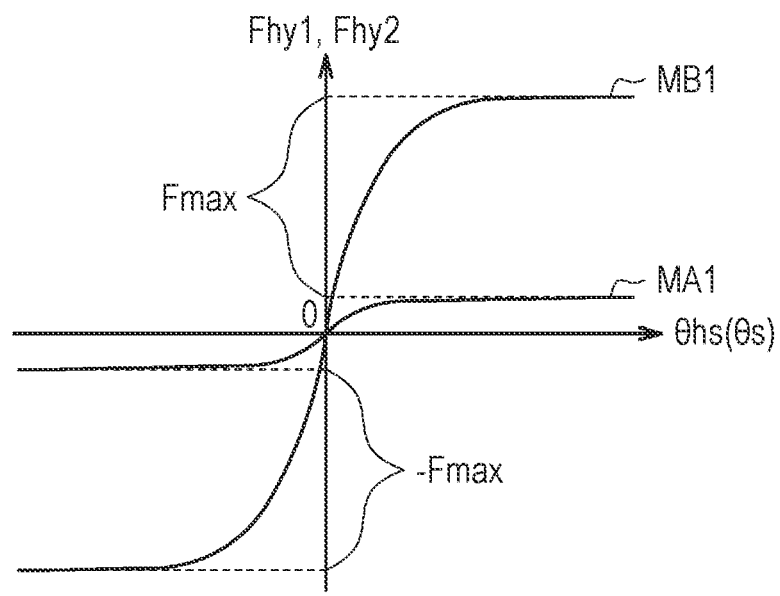
FIG. 7A is a graph illustrating a relationship between a steering angle and a hysteresis component at the time of turn steering.
Figure 7B:
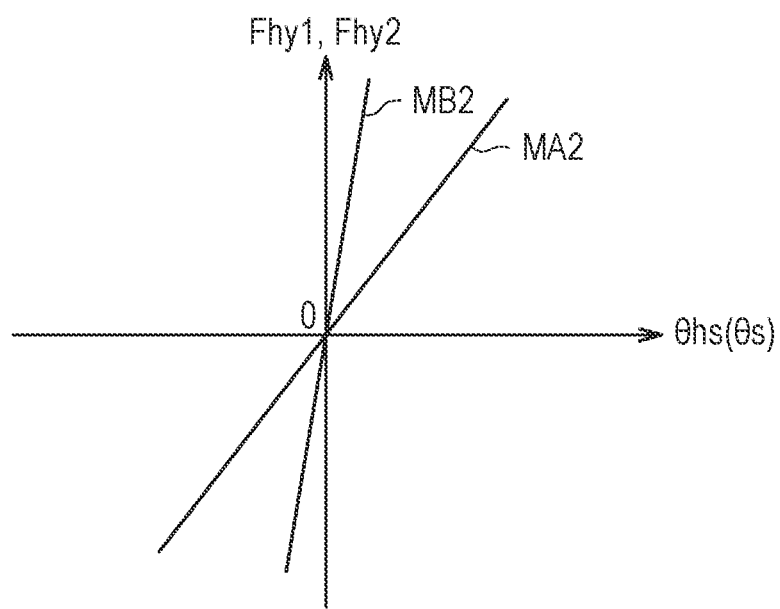
FIG. 7B is a graph illustrating a relationship between a steering angle and a hysteresis component at the time of return steering.

As illustrated in FIGS. 7A and 7B, the traveling hysteresis component calculating unit 112 includes hysteresis maps MA1 and MA2 in which a relationship between the steering angle θs and the traveling hysteresis component Fhy1 is defined. The traveling hysteresis component calculating unit 112 calculates the traveling hysteresis component Fhy1 using one of the hysteresis maps MA1 and MA2 according to whether steering that is being performed is turn steering or return steering which is determined in the same way as in the traveling zero point calculating unit 111. In the hysteresis maps MA1 and MA2, "θs" denotes change of the steering angle θs, that is, an angle deviation θhs when the steering angle θs at the start position of turn steering or return steering, that is, the traveling zero point Pr is set as an origin.

Specifically, the traveling hysteresis component calculating unit 112 calculates the traveling hysteresis component Fhy1 using the hysteresis map MA1 at the time of turn steering. In this case, the traveling hysteresis component Fhy1 is calculated such that the absolute value thereof increases and the absolute value of a hysteresis gradient, which is a rate of change at the time of rising of the traveling hysteresis component Fhy1 with respect to the angle deviation θhs, decreases as the absolute value of the angle deviation θhs increases. The absolute value of the traveling hysteresis component Fhy1 in this case is saturated in a range in which the angle deviation θhs is equal to or greater than a predetermined value and is calculated such that a maximum value of the value at that time is equal to or less than a maximum value Fmax.

The traveling hysteresis component calculating unit 112 uses a value appearing in a first quadrant with the traveling zero point Pr at the start position of the turn steering serving as the origin of the hysteresis map MA1, when turn steering to right is performed. The traveling hysteresis component calculating unit 112 uses a value appearing in a third quadrant with the traveling zero point Pr at the start position of the turn steering serving as the origin of the hysteresis map MA1, when turn steering to left is performed.

On the other hand, the traveling hysteresis component calculating unit 112 calculates the traveling hysteresis component Fhy1 using the hysteresis map MA2 at the time of return steering. In this case, the traveling hysteresis component Fhy1 is calculated to be proportional to the angle deviation θhs. The traveling hysteresis component Fhy1 in this case is calculated only when the angle deviation θhs is within a predetermined range from the traveling zero point Pr.

The traveling hysteresis component calculating unit 112 uses a value appearing in the first quadrant only when the angle deviation θhs is within a predetermined range from the origin with the traveling zero point Pr at the start position of the return steering serving as the origin of the hysteresis map MA2, in the case where return steering to right is performed. The traveling hysteresis component calculating unit 112 uses a value appearing in the third quadrant only when the angle deviation θhs is within a predetermined range from the origin with the traveling zero point Pr at the start position of the return steering serving as the origin of the hysteresis map MA2, in the case where return steering to left is performed.

In this embodiment, the hysteresis maps MA1 and MA2 are configured to change the traveling hysteresis component Fhy1 according to the vehicle speed V. The hysteresis maps MA1 and MA2 change the traveling hysteresis component Fhy1 according to the vehicle speed V for the purpose of realizing a desired feeling of steering. In this embodiment, for example, the traveling hysteresis component Fhy1 is changed such that the hysteresis gradient increases as the vehicle speed V decreases. The hysteresis maps MA1 and MA2 change the traveling hysteresis component Fhy1 such that the maximum value Fmax increases as the vehicle speed V increases. For example, in the case in which the vehicle speed V is an extremely low speed which is a traveling state including a stopped state, for example, a vehicle speed less than 6 km/h, the maximum value Fmax is set to a large value which is up to 10 times the maximum value Fmax in the case in which the vehicle speed is a middle or high speed which is a traveling state that does not include a stopped state, for example, a vehicle speed equal to or higher than 10 km/h. The traveling hysteresis component Fhy1 may be changed according to the steering velocity ωs which is a differential value of the steering angle θs. In this case, for example, the traveling hysteresis component Fhy1 may be changed such that the hysteresis gradient decreases as the steering velocity ωs increases.

Accordingly, when sine steering in which turn steering and return steering of the steering wheel 3 are repeatedly performed periodically at a constant frequency is performed, the traveling hysteresis component calculating unit 112 calculates the traveling hysteresis component Fhy1 such that hysteresis characteristics with respect to change of the steering angle θs are provided. The acquired traveling hysteresis component Fhy1 is output to a multiplier 114.

Figure 8:
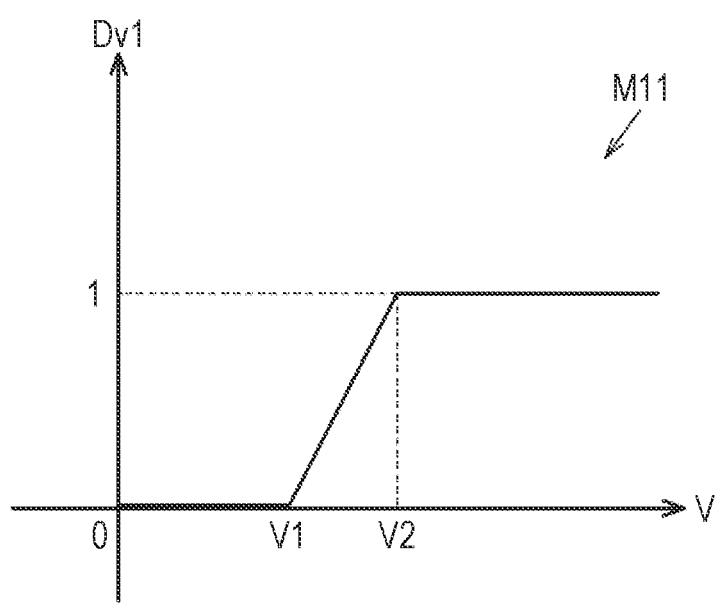
FIG. 8 is a graph illustrating a relationship between a vehicle speed and a traveling vehicle speed gain.

The vehicle speed V is input to the traveling vehicle speed gain calculating unit 113. The traveling vehicle speed gain calculating unit 113 calculates a traveling vehicle speed gain Dv1 based on the vehicle speed V. As illustrated in FIG. 8. The traveling vehicle speed gain calculating unit 113 includes a vehicle speed gain map M11 in which a relationship between the vehicle speed V and the traveling vehicle speed gain Dv1 is defined, and calculates the traveling vehicle speed gain Dv1 using the map and using the vehicle speed V as an input. For example, when the vehicle speed V is an extremely low speed, that is, when the vehicle speed V is less than a first threshold value V1, the traveling vehicle speed gain calculating unit 113 calculates the traveling vehicle speed gain Dv1 as zero value (0%)." For example, when the vehicle speed V is a middle or high speed, that is, when the vehicle speed V is equal to or higher than a second threshold value V2, the traveling vehicle speed gain calculating unit 113 calculates the traveling vehicle speed gain Dv1 as "1 (100%)." For example, when the vehicle speed V is a low speed between the extremely low speed and the middle or high speed, that is, when the vehicle speed V is equal to or higher than the first threshold value V1 and equal to or less than the second threshold value V2, the traveling vehicle speed gain calculating unit 113 calculates the traveling vehicle speed gain Dv1 such that the "zero value" and "1" are connected linearly. In this embodiment, the vehicle speed V less than the first threshold value V1 corresponds to a second vehicle speed which is determined to correspond to a second state, and the vehicle speed V equal to or higher than the first threshold value, that is, equal to or higher than the second threshold value V2, corresponds to a first vehicle speed which is determined to correspond to a first state.

The traveling hysteresis component Fhy1 is multiplied by the acquired traveling vehicle speed gain Dv1, and the resultant is output as a traveling hysteresis compensation value I3* acquired from the multiplier 114, to the adder 73. The angle axial force calculating unit 101 will be described below.

Figure 9:
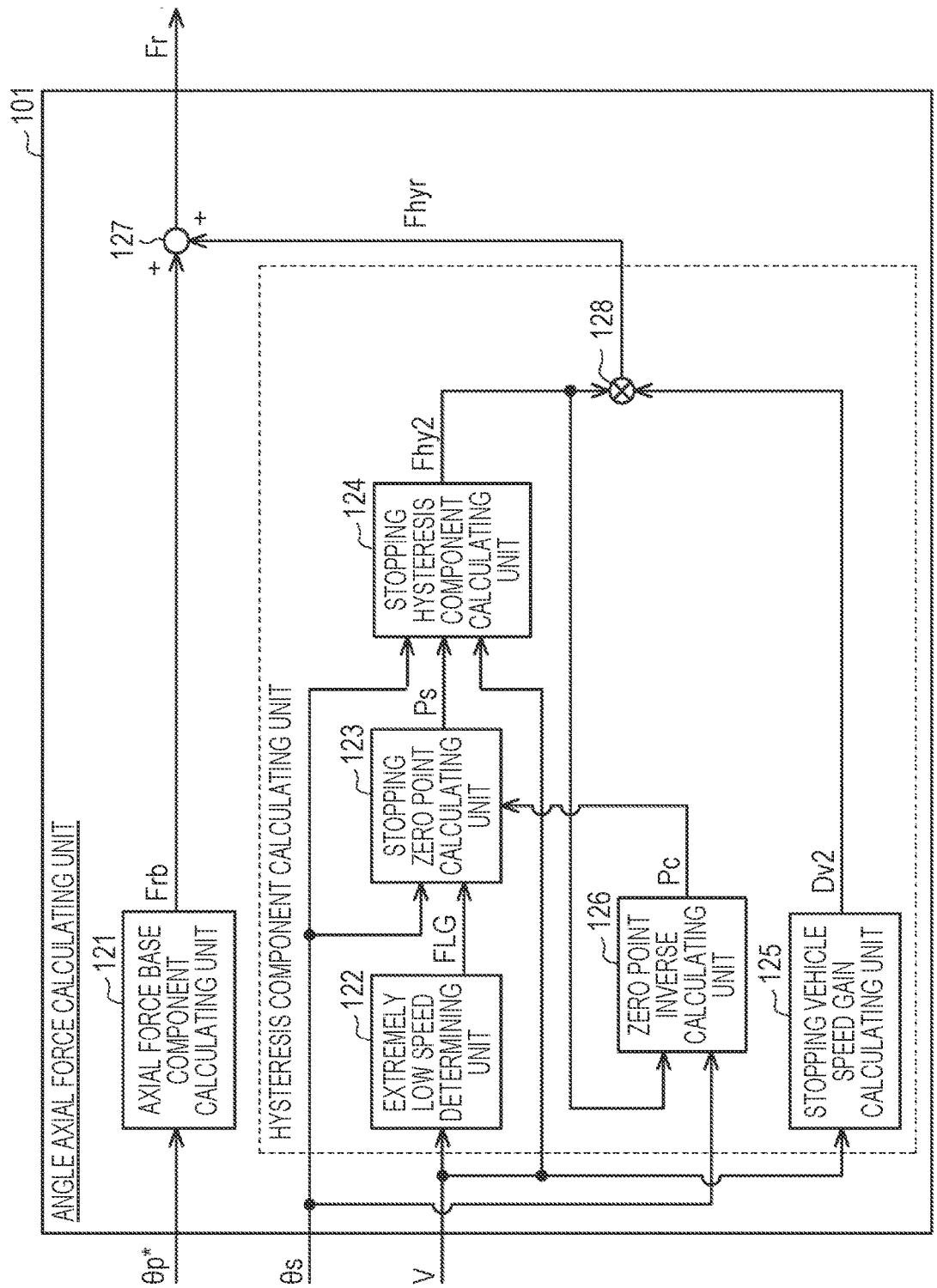
FIG. 9 is a block diagram illustrating a functional configuration of an angle axial force calculating unit according to the first embodiment.

As illustrated in FIG. 9, the angle axial force calculating unit 101 includes an axial force base component calculating unit 121, an extremely low speed determining unit 122, a stopping zero point calculating unit 123, a stopping hysteresis component calculating unit 124, a stopping vehicle speed gain calculating unit 125, and a zero point inverse calculating unit 126.

The target pinion angle θp* is input to the axial force base component calculating unit 121. The axial force base component calculating unit 121 calculates an axial force base component Frb which is a base component of the angle axial force Fr, based on the target pinion angle θp*. Specifically, the axial force base component calculating unit 121 calculates the axial force base component Frb such that the absolute value thereof increases as the absolute value of the target pinion angle θp* increases. The axial force base component Frb is calculated as a value with the dimension of a torque (N·m). The acquired axial force base component Frb is output to an adder 127.

The vehicle speed V is input to the extremely low speed determining unit 122. When it is detected that the vehicle speed V that was higher than the first threshold value V1 has changed to become less than the first threshold value V1 (i.e., the vehicle speed V has changed to become less than the first threshold value V1 via the first threshold value V1), the extremely low speed determining unit 122 generates a determination flag FLG indicating that the change has been detected. In this embodiment, the situation in which the vehicle speed V that was higher than the first threshold value V1 has changed to become less than the first threshold value V1 corresponds to a situation in which change of the vehicle speed V from the first vehicle speed to the second vehicle speed is detected. The acquired determination flag FLG is output to the stopping zero point calculating unit 123.

The steering angle θs, the determination flag FLG, and a correction zero point Pc which will be described later are input to the stopping zero point calculating unit 123. The stopping zero point calculating unit 123 calculates a stopping zero point Ps used when the stopping hysteresis component calculating unit 124 calculates a stopping hysteresis component Fhy2, based on the steering angle θs. When the start of turn steering or the start of return steering is determined, the stopping zero point calculating unit 123 calculates the steering angle θs at the start position as the stopping zero point Ps in the same way as the way in which the traveling zero point calculating unit 111 calculates the traveling zero point Pr.

When the determination flag FLG is not input, the stopping zero point calculating unit 123 calculates the stopping zero point Ps acquired by calculation, as a final stopping zero point Ps. That is, when the determination flag FLG is not input, the stopping zero point calculating unit 123 updates the stopping zero point Ps every time the start of turn steering or the start of return steering is determined.

On the other hand, when the determination flag FLG is input, the stopping zero point calculating unit 123 calculates, as the final stopping zero point Ps, the stopping zero point Ps acquired by correcting the stopping zero point Ps acquired by calculation to a correction zero point Pc. The correction zero point Pc is acquired by the zero point inverse calculating unit 126. That is, when the determination flag FLG is input, the stopping zero point calculating unit 123 does not determine the start of turn steering or the start of return steering and updates the stopping zero point Ps such that it becomes the correction zero point Pc acquired by the zero point inverse calculating unit 126. Calculation of the correction zero point Pc will be described later in detail. The acquired final stopping zero point Ps is output to the stopping hysteresis component calculating unit 124.

The steering angle θs, the stopping zero point Ps, and the vehicle speed V are input to the stopping hysteresis component calculating unit 124. The stopping hysteresis component calculating unit 124 calculates a stopping hysteresis component Fhy2 which is a component added to the axial force base component Frb such that the angle axial force Fr has hysteresis characteristics, based on the steering angle θs, the stopping zero point Ps, and the vehicle speed V.

As illustrated in FIGS. 7A and 7B, the stopping hysteresis component calculating unit 124 includes hysteresis maps MB1 and MB2 in which a relationship between the steering angle θs and the stopping hysteresis component Fhy2 is defined. The hysteresis maps MB1 and MB2 basically have the same configurations as those of the hysteresis maps MA1 and MA2 included in the traveling hysteresis component calculating unit 112.

The stopping hysteresis component calculating unit 124 calculates the stopping hysteresis component Fhy2 in the same way as the way in which the traveling hysteresis component calculating unit 112 calculates the traveling hysteresis component Fhy1. That is, the stopping hysteresis component calculating unit 124 uses a value appearing in the first quadrant with the stopping zero point Ps at the start position of the turn steering serving as the origin of the hysteresis map MB1, when turn steering to right is performed. The stopping hysteresis component calculating unit 124 uses a value appearing in the third quadrant with the stopping zero point Ps at the start position of the turn steering serving as the origin of the hysteresis map MB1, when turn steering to left is performed. The stopping hysteresis component calculating unit 124 uses a value appearing in the first quadrant only when the angle deviation θhs is within a predetermined range from the origin with the stopping zero point Ps at the start position of the return steering serving as the origin of the hysteresis map MB2, in the case in which return steering to right is performed. The stopping hysteresis component calculating unit 124 uses a value appearing in the third quadrant only when the angle deviation θhs is within a predetermined range from the origin with the stopping zero point Ps at the start position of the return steering serving as the origin of the hysteresis map MB2, in the case in which return steering to left is performed.

Accordingly, when sine steering in which turn steering and return steering of the steering wheel 3 are repeatedly performed periodically at a constant frequency is performed, the stopping hysteresis component calculating unit 124 calculates the stopping hysteresis component Fhy2 such that hysteresis characteristics with respect to change of the steering angle θs are provided. The acquired stopping hysteresis component Fhy2 is output to the multiplier 128 and the zero point inverse calculating unit 126.

In this embodiment, the characteristics indicated by the stopping hysteresis component Fhy2 which is calculated when the vehicle speed V is the middle or high speed are an example of a first hysteresis characteristic. That is, the situation in which the stopping hysteresis component Fhy2 is calculated when the vehicle speed V is the middle or high speed is an example of a first calculation situation. The characteristics indicated by the stopping hysteresis component Fhy2 which is calculated when the vehicle speed V is the extremely low speed are an example of a second hysteresis characteristic. That is, the situation in which the stopping hysteresis component Fhy2 is calculated when the vehicle speed V is the extremely low speed is an example of a second calculation situation.

Figure 10:
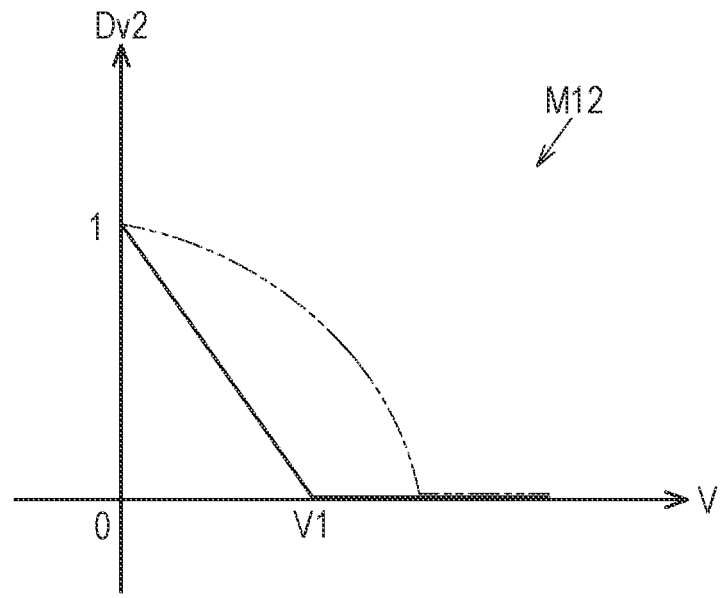
FIG. 10 is a graph illustrating a relationship between a steering angle and a stopping vehicle speed gain during stoppage.

The vehicle speed V is input to the stopping vehicle speed gain calculating unit 125. The stopping vehicle speed gain calculating unit 125 calculates a stopping vehicle speed gain Dv2 based on the vehicle speed V. As illustrated in FIG. 10, the stopping vehicle speed gain calculating unit 125 includes a vehicle speed gain map M12 in which a relationship between the vehicle speed V and the stopping vehicle speed gain Dv2 is defined, and calculates the stopping vehicle speed gain Dv2 using the map and using the vehicle speed V as an input. For example, when the vehicle speed V is a low speed or a middle or high speed, that is, when the vehicle speed V is equal to or higher than the first threshold value V1, the stopping vehicle speed gain calculating unit 125 calculates the stopping vehicle speed gain Dv2 as "zero value (0%)." For example, when the vehicle speed V is zero value, the stopping vehicle speed gain calculating unit 125 calculates the stopping vehicle speed gain Dv2 as "1 (100%)." For example, when the vehicle speed V is an extremely low speed, that is, when the vehicle speed V is less than the first threshold value V1, the stopping vehicle speed gain calculating unit 125 calculates the stopping vehicle speed gain Dv2 such that the "zero point" and the value "1" are linearly connected.

The stopping vehicle speed gain calculating unit 125 limits a rate of change of the stopping vehicle speed gain Dv2 per calculation cycle to a predetermined limit value while the vehicle speed V is increasing from the zero value to the middle or high speed, that is, to the second threshold value V2. When the rate of change per calculation cycle of the stopping vehicle speed gain Dv2 is greater than the limit value, the stopping vehicle speed gain calculating unit 125 limits the rate of change per calculation cycle of the stopping vehicle speed gain Dv2 to the limit value. Accordingly, the stopping vehicle speed gain calculating unit 125 changes the stopping vehicle speed gain Dv2 more gradually than in a previous cycle (one cycle before) while the vehicle speed V is increasing from the zero value to the middle or high speed, that is, to the second threshold value V2. That is, the stopping vehicle speed gain calculating unit 125 has a function of performing compensation for the stopping vehicle speed gain Dv2 such that sudden change of the stopping vehicle speed gain Dv2 is curbed while the vehicle speed V is increasing from the zero value to the middle or high speed, that is, to the second threshold value V2. In this embodiment, as indicated by an alternate long and two short dashes line in FIG. 10, for example, the limit value changes such that it increases as the vehicle speed V increases. The limit value is set based on by experiment, simulation, or the like, from a point of view of realizing change in stiffness of the turning wheels 5 occurring while the vehicle speed V is increasing from the zero value to the middle or high speed, that is, to the second threshold value V2.

The stopping hysteresis component Fhy2 is multiplied by the acquired stopping vehicle speed gain Dv2 by the multiplier 128 and the resultant is input as an angle-axial-force hysteresis component Fhyr to an adder 127. The adder 127 calculates the angle axial force Fr by adding the angle-axial-force hysteresis component Fhyr to the axial force base component Frb and outputs the acquired angle axial force Fr to the multiplier 104.

In this embodiment, the stopping vehicle speed gain Dv2 is an example of a vehicle speed coefficient, and the stopping vehicle speed gain calculating unit 125 is an example of a coefficient calculating unit. The stopping vehicle speed gain Dv2 which is calculated when the vehicle speed V is less than the first threshold value V1 corresponds to a second vehicle speed coefficient, and the stopping vehicle speed gain Dv2 which is calculated when the vehicle speed V is equal to or higher than the first threshold value V1 corresponds to a first vehicle speed coefficient.

In this embodiment, the traveling hysteresis compensation value I3* is for performing compensation such that the hysteresis characteristics due to friction at the time of operation of the steering wheel 3 are optimized particularly in a traveling state of the vehicle that does not include a stopped state. The traveling state of the vehicle that does not include the stopped state is a state in which the vehicle is traveling at a middle or high speed, for example, a vehicle speed equal to or higher than 10 km/h. The traveling hysteresis compensation value I3* has hysteresis characteristics with respect to change of the steering angle θs. The acquired traveling hysteresis compensation value I3* is output to the adder 73.

As illustrated in FIG. 9, the stopping hysteresis component Fhy2 and the steering angle θs are input to the zero point inverse calculating unit 126. The zero point inverse calculating unit 126 calculates a correction zero point Pc based on the stopping hysteresis component Fhy2 and the steering angle θs. The zero point inverse calculating unit 126 includes the hysteresis maps MB1 (V<V1) and MB2 (V<V1) in the case in which the vehicle speed V is particularly the extremely low speed, out of the hysteresis maps MB1 and MB2 included in the stopping hysteresis component calculating unit 124. When the start of turn steering or the start of return steering is determined, the zero point inverse calculating unit 126 calculates the steering angle θs at the start position as the stopping zero point Ps, in the same way as the way in which the stopping zero point calculating unit 123 calculates the stopping zero point Ps. In this case, the zero point inverse calculating unit 126 calculates change of the steering angle θs, that is, the angle deviation θhs, with the stopping zero point Ps serving as the origin, based on the steering angle θs.

The zero point inverse calculating unit 126 calculates the angle deviation θhs corresponding to the origin in the hysteresis map MB1 (V<V1) and MB2 (V<V1) at the time when the stopping hysteresis component Fhy2 with the same value as the input stopping hysteresis component Fhy2 is calculated. In this case, the zero point inverse calculating unit 126 uses a value appearing in the first quadrant of the hysteresis map MB1 (V<V1), when turn steering to right is performed. The zero point inverse calculating unit 126 uses a value appearing in the third quadrant of the hysteresis map MB1 (V<V1), when turn steering to left is performed. The zero point inverse calculating unit 126 uses a value appearing in the first quadrant of the hysteresis map MB2 (V<V1), when return steering to right is performed. The zero point inverse calculating unit 126 uses a value appearing in the third quadrant of the hysteresis map MB2 (V<V1), when return steering to left is performed.

Figure 11:
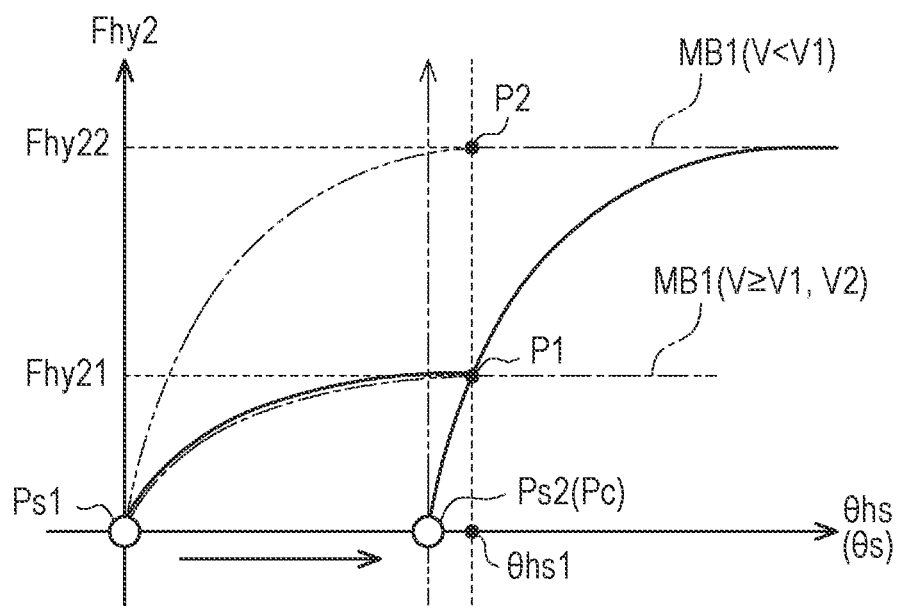
FIG. 11 is a graph illustrating a relationship between a steering angle and a stopping hysteresis component in a situation in which a first vehicle speed has been changed to a second vehicle speed.

For example, as illustrated in FIG. 11, it is assumed that a point indicating an input [stopping hysteresis component Fhy2, angle deviation θhs] in a coordinate system in which the horizontal axis represents the angle deviation θhs and the vertical axis represents the stopping hysteresis component Fhy2 is located at coordinates P1 based on the premise that turn steering to right is performed. Here, the value appearing in the first quadrant of the hysteresis map MB1 (V<V1) indicated by an alternate long and two short dashes line in FIG. 11 is entirely offset to shift to the right, that is, to the side in which the angle deviation θhs increases in a positive direction, up to a position at which the hysteresis map MB1 (V<V1) overlaps the coordinates P1. In the hysteresis map MB1 (V<V1) having been offset as indicated by a solid line in FIG. 11, the value of the steering angle θs corresponding to the value of the angle deviation θhs on the horizontal axis is a correction zero point Pc. In this case, the correction zero point Pc is acquired as a value obtained by subtracting the value of the angle deviation θhs on the horizontal axis from the steering angle θs corresponding to the stopping zero point Ps. With the angle deviation θhs acquired by updating the origin to the correction zero point Pc, the same value as the value of the stopping hysteresis component Fhy2 input to the zero point inverse calculating unit 126 at that time is acquired as the stopping hysteresis component Fhy2 calculated using the hysteresis map MB1 (V<V1). The same applies to the value appearing in the third quadrant of the hysteresis map MB1 (V<V1) based on the premise that turn steering to left is performed, and the value appearing in the third quadrant is offset to the left side, that is, to the side in which the angle deviation θhs increases in the negative direction. The same applies to the value appearing in the first quadrant of the hysteresis map MB2 (V<V1) when return steering to right is performed, and the value appearing in the first quadrant is offset to the right side, that is, to the side in which the angle deviation θhs increases in the positive direction. The same applies to the value appearing in the third quadrant of the hysteresis map MB2 (V<V1) when return steering to left is performed, and the value appearing in the third quadrant is offset to the left side, that is, to the side in which the angle deviation θhs increases in the negative direction. The acquired correction zero point Pc is output to the stopping zero point calculating unit 123. In this embodiment, the extremely low speed determining unit 122, the stopping zero point calculating unit 123, the stopping hysteresis component calculating unit 124, the stopping vehicle speed gain calculating unit 125, the zero point inverse calculating unit 126, and the multiplier 128 are an example of a hysteresis component calculating unit.

Operations in the first embodiment will be described below. In this embodiment, the stopping hysteresis component Fhy2 can be calculated by correcting the origins of the hysteresis maps MB1 and MB2 depending on whether the vehicle speed V is an extremely low speed. For example, the situation in which it is detected that the vehicle speed V changes from a middle or low speed to an extremely low speed via a low speed is a situation in which the hysteresis width is assumed to change greatly before and after changing to the extremely low speed when the stopping hysteresis component Fhy2 is calculated. This is because the maximum value Fmax of the stopping hysteresis component Fhy2 in the hysteresis map MB1 (V<V1) used after change to the extremely low speed is set to be larger than that in the hysteresis map MB1 (V≥V1, V2) used before change to the extremely low speed. The same applies to the hysteresis map MB2 (V≥V1, V2) and the hysteresis map MB2 (V<V1, V2).

In this embodiment, the stopping zero point calculating unit 123 can determine that the vehicle speed V changes from the middle or high speed to the extremely low speed via the low speed using the determination flag FLG. When the determination flag FLG is input, the stopping zero point calculating unit 123 updates the stopping zero point Ps acquired by calculation to the correction zero point Pc acquired by the zero point inverse calculating unit 126.

For example, it is assumed that the situation illustrated in FIG. 11 represents an instant at which the vehicle speed V changes from the middle or high speed to the extremely low speed via the low speed based on the premise that turn steering to right is performed. In this instant, when the angle deviation θhs has a first deviation value θhs1, the stopping hysteresis component Fhy2 of a first component value Fhy21 corresponding to the coordinates P1 is calculated based on the hysteresis map MB1(V≥V1, V2).

Subsequently, immediately after the vehicle speed V has changed to the extremely low speed, the hysteresis map MB1 (V<V1) indicated by the alternate long and two short dashes line in FIG. 11 is used to calculate the stopping hysteresis component Fhy2. When the start of turn steering or the start of return steering is not performed immediately after the vehicle speed V has changed to the extremely low speed, the stopping zero point Ps ("Ps1" in FIG. 11) at the instant at which the vehicle speed V has changed from the middle or high speed to the extremely low speed via the low speed is maintained. In this case, when the angle deviation θhs is maintained at the first deviation value θhs1 immediately after the vehicle speed V has changed to the extremely low speed, the stopping hysteresis component Fhy2 with a second component value Fhy22 corresponding to the coordinates P2 is calculated based on the hysteresis map MB1 (V<V1). An example of the situation in which the angle deviation θhs is maintained at the first deviation value θhs1 is a hands-free state in which the steering wheel 3 is not held by a driver. That is, immediately after the vehicle speed V has changed to the extremely low speed, there is a likelihood that the hysteresis width of the stopping hysteresis component Fhy2 will change suddenly because the hysteresis map MB1 (V<V1) indicated by the alternate long and two short dashes line in FIG. 11 is used.

On the other hand, in this embodiment, even when the start of turn steering or the start of return steering is not performed immediately after the vehicle speed V has changed to the extremely low speed, the stopping zero point Ps is updated to the correction zero point Pc on the condition that the vehicle speed V has changed to the extremely low speed as indicated by an arrow in FIG. 11. Accordingly, as indicated by the arrow in FIG. 11, the stopping zero point Ps is updated from "Ps1" to the correction zero point Pc ("Ps2" in FIG. 11). In this case, even when the angle deviation θhs is maintained at the first deviation value θhs1, the stopping hysteresis component Fhy2 with the first component value Fhy21 corresponding to the coordinates P1 is calculated based on the hysteresis map MB1 (V<V1) indicated by the solid line in FIG. 11.

Accordingly, when the vehicle speed V has changed from the middle or high speed to the extremely low speed via the low speed, it is possible to curb sudden change of the hysteresis width between the pre-change stopping hysteresis component Fhy2 and the post-change stopping hysteresis component Fhy2.

Figure 12A:
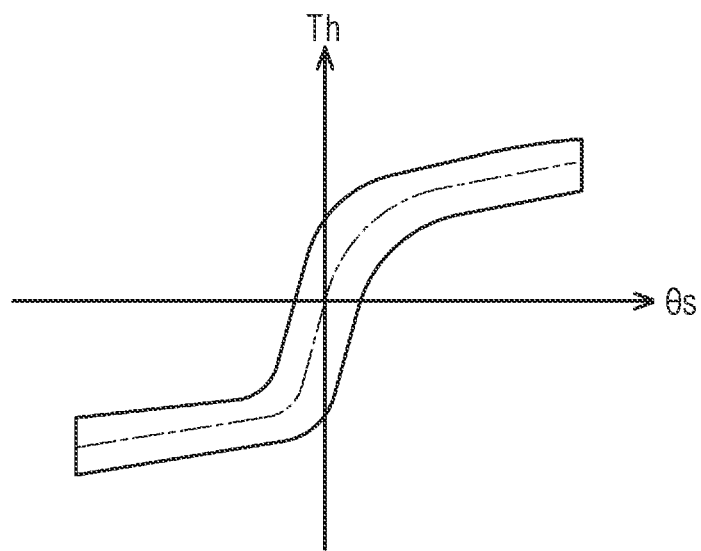
FIG. 12A is a graph illustrating a relationship between a steering angle and a steering torque during traveling.
Figure 12B:
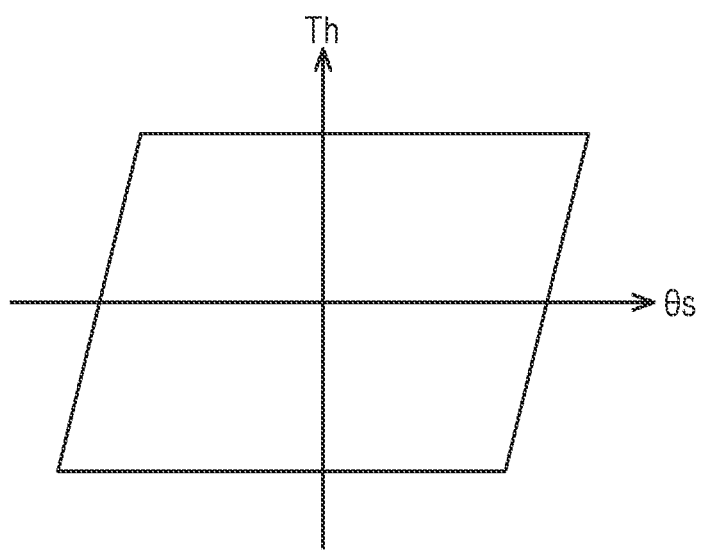
FIG. 12B is a graph illustrating a relationship between a steering angle and a steering torque during stoppage.

It is assumed that the characteristics illustrated in FIG. 12A represent traveling steering characteristics which are indicated by the relationship between the steering angle θs and the steering torque Th when sine steering of the steering wheel 3 is performed in a state in which the vehicle speed V is a low speed or a middle or high speed. On the other hand, it is assumed that the characteristics illustrated in FIG. 12B represent stopping steering characteristics which are indicated by the relationship between the steering angle θs and the steering torque Th when sine steering of the steering wheel 3 is performed in a state in which the vehicle speed V is an extremely low speed.

The traveling steering characteristics and the stopping steering characteristics change according to the vehicle speed V, and the traveling steering characteristics change to the stopping steering characteristics when the vehicle speed V changes from the middle or high speed to the extremely low speed via the low speed. In this case, the hysteresis width changes greatly between the steering characteristics when sine steering of the steering wheel 3 is performed, but sudden change of the hysteresis width in the process of change thereof is curbed.

Advantages in this embodiment will be described below.
(1-1) In this embodiment, since a situation in which the hysteresis width changes suddenly in the stopping hysteresis component Fhy2 is curbed, it is possible to restrain a situation in which movement of the steering wheel 3 or a feeling acquired from the steering wheel 3 causes discomfort. Accordingly, it is possible to achieve improvement of a feeling of steering.

(1-2) According to this embodiment, when the vehicle speed V has changed from the middle or high speed to the extremely low speed via the low speed, the value of the stopping hysteresis component Fhy2 at the timing of change thereof can be maintained. Accordingly, even when the vehicle speed V has changed from the middle or high speed to the extremely low speed via the low speed, it is possible to achieve improvement of a feeling of steering. From a point of view of transmitting friction of the turning wheels 5 to a driver, it is convenient to greatly change the hysteresis width in the traveling state at the extremely low speed, between the traveling state at the low speed or the middle or high speed and the traveling state at the extremely low speed. That is, the situation in which the hysteresis width is assumed to greatly change when the stopping hysteresis component Fhy2 is calculated corresponds to a situation in which the vehicle speed V has changed from the middle or high speed to the extremely low speed via the low speed. Accordingly, it is possible to achieve improvement of a feeling of steering while realizing a convenient mode from a point of view of transmitting friction of the turning wheels 5 to a driver.

(1-3) According to this embodiment, it is possible to achieve optimization with regard to a situation in which the value of the stopping hysteresis component Fhy2 is maintained, through an approach using the vehicle speed V.

Second Embodiment

A steering control device according to a second embodiment will be described below with reference to the accompanying drawings. Differences from the first embodiment will be mainly described herein. The same elements as in the first embodiment will be referred to by the same reference signs and description thereof will not be repeated.

Figure 13:
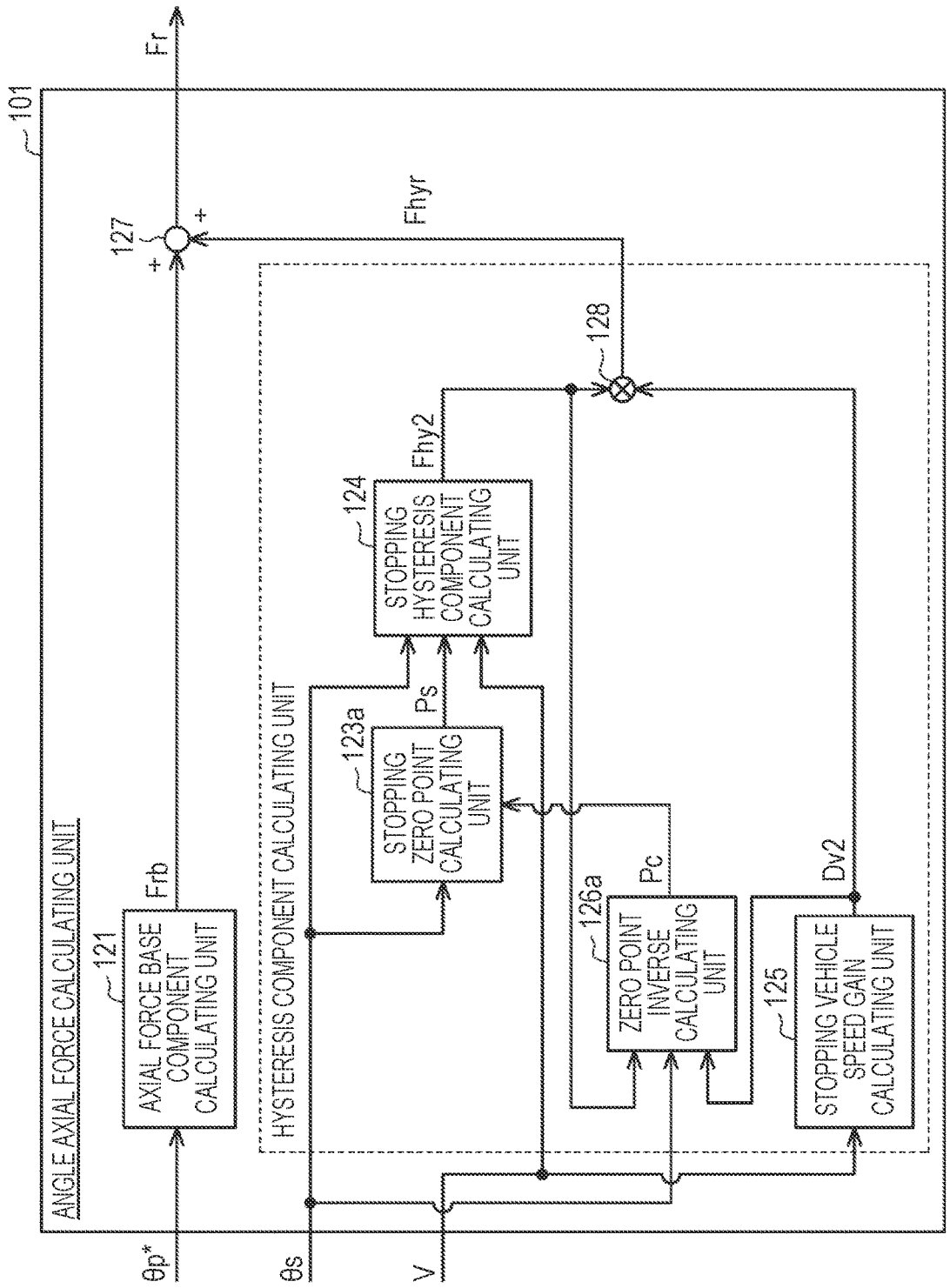
FIG. 13 is a block diagram illustrating a functional configuration of an angle axial force calculating unit according to a second embodiment.

The angle axial force calculating unit 101 will be described. As illustrated in FIG. 13, the angle axial force calculating unit 101 has a configuration in which the extremely low speed determining unit 122 is omitted from the configuration described above in the first embodiment. In the angle axial force calculating unit 101, the stopping zero point calculating unit 123 and the zero point inverse calculating unit 126 according to the first embodiment are modified with omission of the extremely low speed determining unit 122.

Specifically, the steering angle θs and the correction zero point Pc are input to a stopping zero point calculating unit 123a corresponding to the stopping zero point calculating unit 123 according to the first embodiment. The stopping zero point calculating unit 123a calculates the stopping zero point Ps in the same way as in the stopping zero point calculating unit 123 according to the first embodiment. When the correction zero point Pc is not input, the stopping zero point calculating unit 123a calculates the stopping zero point Ps acquired by calculation, as a final stopping zero point Ps. On the other hand, when the correction zero point Pc is input, the stopping zero point calculating unit 123a calculates a stopping zero point Ps obtained by correcting the stopping zero point Ps acquired by calculation to the correction zero point Pc, as the final stopping zero point Ps.

The stopping hysteresis component Fhy2, the steering angle θs, and the stopping vehicle speed gain Dv2 are input to a zero point inverse calculating unit 126a corresponding to the zero point inverse calculating unit 126 according to the first embodiment. When it is not detected that the value of the stopping vehicle speed gain Dv2 starts changing, that is, increasing, from the "zero value," in other words, the value does not change, or when it is detected that the value of the stopping vehicle speed gain Dv2 starts decreasing from "1" to the "zero value," the zero point inverse calculating unit 126a neither calculates nor outputs the correction zero point Pc. On the other hand, when it is detected that the value of the stopping vehicle speed gain Dv2 starts changing, that is, increasing from the "zero value," the zero point inverse calculating unit 126a calculates and outputs the correction zero point Pc to the stopping zero point calculating unit 123a similarly to the zero point inverse calculating unit 126 according to the first embodiment. That is, when it is detected that the value of the stopping vehicle speed gain Dv2 starts increasing from the "zero value," the zero point inverse calculating unit 126a does not determine the start of turn steering or the start of return steering and calculates and outputs the correction zero point Pc such that the stopping zero point Ps is updated by the stopping zero point calculating unit 123a.

According to this embodiment, the following advantages can be achieved in addition to the operations and advantages of the first embodiment. (2-1) According to this embodiment, it is possible to achieve optimization with regard to a situation in which the value of the stopping hysteresis component Fhy2 is maintained, through an approach using the stopping vehicle speed gain Dv2.

The aforementioned embodiments may be modified as follows. The following modified examples can be combined unless technical conflictions arise. In the first embodiment, the function of the extremely low speed determining unit 122 may be realized as the function of the stopping zero point calculating unit 123. That is, the vehicle speed V can be input to the stopping zero point calculating unit 123. In addition, the function of the extremely low speed determining unit 122 may be realized as the function of the zero point inverse calculating unit 126. In this case, the vehicle speed V can be input to the zero point inverse calculating unit 126. Similarly to the second embodiment, the correction zero point Pc may be input to the stopping zero point calculating unit 123 in only necessary situations. In this case, the function of the extremely low speed determining unit 122 can be omitted.

In the second embodiment, the function of the zero point inverse calculating unit 126a that detects that the value of the stopping vehicle speed gain Dv2 starts increasing from the "zero value" may be realized as the function of the stopping zero point calculating unit 123a. That is, the vehicle speed V may be input to the stopping zero point calculating unit 123a. In this case, the zero point inverse calculating unit 126a may be basically configured to calculate and output the correction zero point Pc. When it is detected that the value of the stopping vehicle speed gain Dv2 starts increasing from the "zero value," the stopping zero point calculating unit 123a may reflect correction based on the input correction zero point Pc. In addition, a calculation unit having the function of the zero point inverse calculating unit 126a that detects that the value of the stopping vehicle speed gain Dv2 starts increasing from the "zero point" may be added to the angle axial force calculating unit 101.

In the first embodiment, the angle-axial-force hysteresis component Fhyr may be input to the zero point inverse calculating unit 126. In this case, the stopping vehicle speed gain Dv2 may be input to the zero point inverse calculating unit 126, and the stopping vehicle speed gain Dv2 may be used to calculate the correction zero point Pc. With regard to the correction zero point Pc, the zero point inverse calculating unit 126 may calculate the angle deviation θhs corresponding to the origin at the time when the same angle-axial-force hysteresis component Fhyr as the value of the input angle-axial-force hysteresis component Fhyr is calculated. In this case, with regard to the correction zero point Pc, the zero point inverse calculating unit 126 may calculate the angle deviation θhs corresponding to the origin at the time when the same stopping hysteresis component Fhy2 as the value of the input angle-axial-force hysteresis component Fhyr is calculated. The same applies to the second embodiment.

In the aforementioned embodiments, a part using the target pinion angle θp* may calculate various components based on a state variable having a correlation with the target pinion angle θp* instead of the target pinion angle θp*. Examples of the state variable having a correlation with the target pinion angle θp* include the pinion angle θp, the steering angle θs, the rotation angle θa, and the rotation angle θb, and these are an example of a state variable changing according to the operation of the steering system 2. The target pinion angle θp* or the angles having a correlation with the target pinion angle θp* are angles which can be converted to the turning angle of the turning wheels 5. That is, the axial force base component Frb or the end axial force Fie may be calculated, for example, based on the pinion angle θp. According to this modified example, the same advantages as in the aforementioned embodiments can be achieved. The same applies to the state variable having a correlation with the target pinion angle θp* such as the steering angle θs or the pinion angle θp. That is, the traveling hysteresis component Fhy1 or the stopping hysteresis component Fhy2 may be calculated, for example, based on the pinion angle θp or the target pinion angle θp* instead of the steering angle θs.

In the aforementioned embodiments, as long as at least a state variable associated with the operation of the steering wheel 3 is used to calculate the steering force Tb*, the steering force calculating unit 55 may not use the vehicle speed V and may use a combination with another element.

As the state variable associated with the operation of the steering wheel 3, the steering angle θs may be used or another element may be used, instead of the steering torque Th described in the aforementioned embodiments.

In the aforementioned embodiments, as long as at least the target pinion angle θp* is used to calculate the axial force base component Frb, the axial force base component calculating unit 121 may use another element such as the vehicle speed V in combination.

In the aforementioned embodiments, as long as at least the steering angle θs is used to calculate the traveling hysteresis component Fhy1, the traveling hysteresis component calculating unit 112 may not use the vehicle speed V. In this case, the magnitude of the maximum value Fmax based on the vehicle speed V in the hysteresis maps MA1 and MA2 or the like may be adjusted using the traveling vehicle speed gain Dv1. The same applies to the case in which the stopping hysteresis component calculating unit 124 calculates the stopping hysteresis component Fhy2. In this case, the magnitude of the maximum value Fmax based on the vehicle speed V in the hysteresis maps MB1 and MB2 or the like may be adjusted using the stopping vehicle speed gain Dv2.

In the aforementioned embodiments, the traveling hysteresis component calculating unit 112 may use another element in combination with the steering angle θs or the vehicle speed V to calculate the traveling hysteresis component Fhy1. The same applies to the case in which the stopping hysteresis component calculating unit 124 calculates the stopping hysteresis component Fhy2.

In the aforementioned embodiments, as long as the vehicle speed V is used to calculate the axial force distribution gain Di, the axial force distribution proportion calculating unit 103 may use another element in combination. In the aforementioned embodiments, the end axial force calculating unit 92 and the difference axial force calculating unit 93 may be deleted from the axial force calculating unit 56. In this case, the axial force selecting unit 94 and the adder 95 may be deleted. The distributed axial force Fd calculated by the distributed axial force calculating unit 91 is output to the subtractor 57.

In the aforementioned embodiments, as long as the vehicle speed V is used to calculate the traveling vehicle speed gain Dv1, the traveling vehicle speed gain calculating unit 113 may use another element in combination. The same applies to the case in which the stopping vehicle speed gain calculating unit 125 calculates the stopping vehicle speed gain Dv2.

In the aforementioned embodiments, the stopping vehicle speed gain calculating unit 125 may gradually change the stopping vehicle speed gain Dv2 with the elapse of time and consider the steering state of the steering unit 4 such as the steering angle θs or the turning state of the turning unit 6 such as the pinion angle θp at the time of gradual change.

In the aforementioned embodiments, another situation may be considered as the situation in which the value of the stopping hysteresis component Fhy2 is maintained. An example of such another situation is a situation in which rotation of the turning wheels 5 is locked while the vehicle is traveling. In the situation in which the rotation of the turning wheels 5 is locked while the vehicle is traveling, there is a likelihood that the vehicle speed V will reach the extremely low speed because the rotation of the turning wheels 5 is locked. This can be estimated, for example, based on a separation between the vehicle speed V and a state variable such as a yaw rate which is generated in the vehicle. An example of such another situation is a situation in which a road on which the vehicle is traveling changes from a high-μ road to a low-μ road.

In the aforementioned embodiments, the target to which the calculational hysteresis component is added is not limited to the angle axial force Fr. As the target to which the calculational hysteresis component is added, a component such as an axial force acquired in consideration of at least one of a yaw rate and a lateral acceleration can be appropriately used as long as it is a component that has hysteresis characteristics and thus is convenient for operating the steering system 2. In this case, even when the same problem as in the aforementioned embodiments is caused, this problem can be solved by employing a configuration based on the embodiments.

In the aforementioned embodiments, the value of the vehicle speed V which is the extremely low speed, that is, the first threshold value V1, may be appropriately modified as long as it includes a stopped state. For example, the first threshold value V1 may be set to a small value such as 3 km/h or may be set to a large value such as 10 km/h which is a low speed.

In the aforementioned embodiments, the steering control device 1 may reflect command values for an automated driving system for realizing various driving support functions or an automated driving function, in the operation of the steering system 2. In this case, even when the same problem as in the aforementioned embodiments is caused, this problem can be solved by employing a configuration based on the embodiments.

In the aforementioned embodiments, the steering-side control unit 50 may be provided as a function of the turning-side control unit 60. In the aforementioned embodiments, the turning-side motor 32 may employ, for example, a configuration in which the turning-side motor 32 is disposed coaxially with the rack shaft 22 or a configuration in which the turning-side motor 32 is connected, via a worm and wheel, to the pinion shaft constituting the rack and pinion mechanism together with the rack shaft 22.

In the aforementioned embodiments, the steering control device 1 may be configured as a processing circuit including (1) one or more processors that operate in accordance with a computer program (software), (2) one or more dedicated hardware circuits such as an application-specific integrated circuit (ASIC) that perform at least some of various processes, or (3) a combination thereof. The processor includes a CPU and memories such as a RAM and a ROM, and the memories store program codes or commands configured to cause the CPU to perform processing. Memories, that is, non-transitory computer-readable media, include all available media that can be accessed by a general-purpose or dedicated computer.

In the aforementioned embodiments, the steering system 2 employs a linkless structure in which the steering unit 4 and the turning unit 6 are normally mechanically disconnected from each other, but the disclosure is not limited thereto and the steering system may employ a structure in which the steering unit 4 and the turning unit 6 can be mechanically disconnected by a clutch. The steering system 2 may be an electric power steering system that applies an assist force which is a force for assisting a driver's steering operation. In this case, the steering wheel 3 is mechanically connected to the pinion shaft 21 via the steering shaft 11. A component corresponding to the angle-axial-force hysteresis component Fhyr in the aforementioned embodiments may be reflected in the assist force. In this case, even when the same problem as in the aforementioned embodiments is caused, this problem can be solved by employing a configuration based on the embodiments.

What is claimed is:

1. A steering system comprising:
an actuator comprising a motor as a drive source;
a steering control device configured to control the motor in the steering system in which a steering torque required for steering a steering wheel is changed using a motor torque applied from an actuator with a motor as a drive source,
the steering control device comprising a processing circuit, and the processing circuit being configured to:
calculate a torque command value that is a target value of a motor torque when operation of the motor is controlled such that the motor torque is generated;
calculate a torque component used to calculate the torque command value based on a state variable changing according to operation of the steering system;
calculate a calculational hysteresis component for adding, to the torque component, a hysteresis characteristic with respect to change of a specific state variable changing with steering of the steering system, the calculational hysteresis component being acquired using, as an origin, a value of the specific state variable set at a predetermined timing;
calculate, in a first calculation situation, the calculational hysteresis component for adding a first hysteresis characteristic to the torque component is calculated; and
calculate, in a second calculation situation, the calculational hysteresis component for adding a second hysteresis characteristic having a hysteresis width larger than a hysteresis width of the first hysteresis characteristic to the torque component,
wherein, in the second calculation situation after change from the first calculation situation, the processing circuit includes a zero point calculating unit configured to calculate a value corresponding to the origin in the second hysteresis characteristic at a time when the calculational hysteresis component enabling a value of the calculational hysteresis component at a timing of the change from the first calculation situation to be maintained is calculated, and calculates the calculational hysteresis component using the value calculated by the zero point calculating unit as the origin;
reflect, in the torque component, the calculational hysteresis component acquired through calculation in the first calculation situation, in a first state in which a vehicle is able to be determined to be in a traveling state that does not include a stopped state; and
reflect, in the torque component, the calculational hysteresis component acquired through calculation in the second calculation situation, in a second state in which the vehicle is able to be determined to be in a traveling state including the stopped state,
wherein the motor torque used for changing the steering torque required for steering the steering wheel of the vehicle is based on the torque component.

2. The steering system according to claim 1, wherein:
the processing circuit is configured to calculate a base component of an angle axial force as the torque component, the angle axial force being determined according to an angle that is convertible to a turning angle of turning wheels of a vehicle, and the angle axial force being an axial force in which road surface information is not reflected; and
the processing circuit is configured to calculate the calculational hysteresis component that is added to the base component.

3. The steering system according to claim 1, wherein:
in a situation in which a vehicle speed is a second vehicle speed determined to correspond to the second state after change from a first vehicle speed determined to correspond to the first state, the processing circuit calculates the calculational hysteresis component enabling a value of the calculational hysteresis component at a timing of the change from the first vehicle speed to be maintained.

4. The steering system according to claim 1, wherein:
the processing circuit is configured to calculate a vehicle speed coefficient changing according to a vehicle speed such that the vehicle speed is reflected in the calculational hysteresis component when the first hysteresis characteristic or the second hysteresis characteristic is added to the torque component; and
in a situation in which the calculated vehicle speed coefficient is a second vehicle speed coefficient calculated at a second vehicle speed determined to correspond to the second state after change from a first vehicle speed coefficient calculated at a first vehicle speed determined to correspond to the first state, the processing circuit calculates the calculational hysteresis component enabling a value of the calculational hysteresis component at a timing of the change from the first vehicle speed coefficient to be maintained.

* * * * *